US011040531B2

(12) United States Patent
Martensson et al.

(10) Patent No.: US 11,040,531 B2
(45) Date of Patent: Jun. 22, 2021

(54) JETTING DEVICES WITH ENERGY OUTPUT DEVICES AND METHODS OF CONTROLLING SAME

(71) Applicant: Mycronic AB, Taby (SE)

(72) Inventors: Gustaf Martensson, Taby (SE); Jesper Sallander, Taby (SE)

(73) Assignee: Mycronic AB, Taby (SE)

(*) Notice: Subject to any disclaimer, the term of this patent is extended or adjusted under 35 U.S.C. 154(b) by 0 days.

(21) Appl. No.: 16/630,179

(22) PCT Filed: Jun. 29, 2018

(86) PCT No.: PCT/EP2018/067616
§ 371 (c)(1),
(2) Date: Jan. 10, 2020

(87) PCT Pub. No.: WO2019/011672
PCT Pub. Date: Jan. 17, 2019

(65) Prior Publication Data
US 2020/0147960 A1    May 14, 2020

(30) Foreign Application Priority Data

Jul. 12, 2017   (SE) .................................. 1730188-8

(51) Int. Cl.
*B41J 2/14* (2006.01)
(52) U.S. Cl.
CPC ....... *B41J 2/14008* (2013.01); *B41J 2/14201* (2013.01)

(58) Field of Classification Search
CPC ...... B41J 2/14008; B41J 2/14201; B41J 2/14; B41J 29/38; B41J 2/04581; B41J 2/04541
See application file for complete search history.

(56) References Cited

U.S. PATENT DOCUMENTS

| 5,320,250 | A  | 6/1994 | La et al. |
| 5,772,106 | A  | 6/1998 | Ayers et al. |
| 5,953,027 | A  | 9/1999 | Suwabe et al. |
| 6,045,208 | A  | 4/2000 | Hirahara et al. |
| 2001/0038402 | A1 | 11/2001 | Percin et al. |
| 2014/0263724 | A1 | 9/2014 | Ovchinnikov et al. |

FOREIGN PATENT DOCUMENTS

| EP | 093321 A2 | 8/1999 |
| EP | 0933212 A2 | 8/1999 |
| EP | 1527877 A1 | 5/2005 |
| WO | WO-9014233 A1 | 11/1990 |
| WO | WO-9964167 A1 | 12/1999 |
| WO | WO-09014233 A1 | 1/2009 |

OTHER PUBLICATIONS

International Search Report PCT/ISA/210 for International Application No. PCT/EP2018/067616 dated Sep. 24, 2018.

*Primary Examiner* — Jannelle M Lebron
(74) *Attorney, Agent, or Firm* — Harness, Dickey & Pierce, P.L.C.

(57) ABSTRACT

A jetting device configured to jet one or more droplets of a viscous medium through the outlet of a nozzle includes an energy output device. The energy output device is configured to direct a quantum of energy into at least a portion of the volume of the viscous medium jetted through the outlet to control a breaking of the droplet from the nozzle. The energy output device may include an acoustic transducer or a piezoelectric material or a laser emitter or a heater.

15 Claims, 8 Drawing Sheets

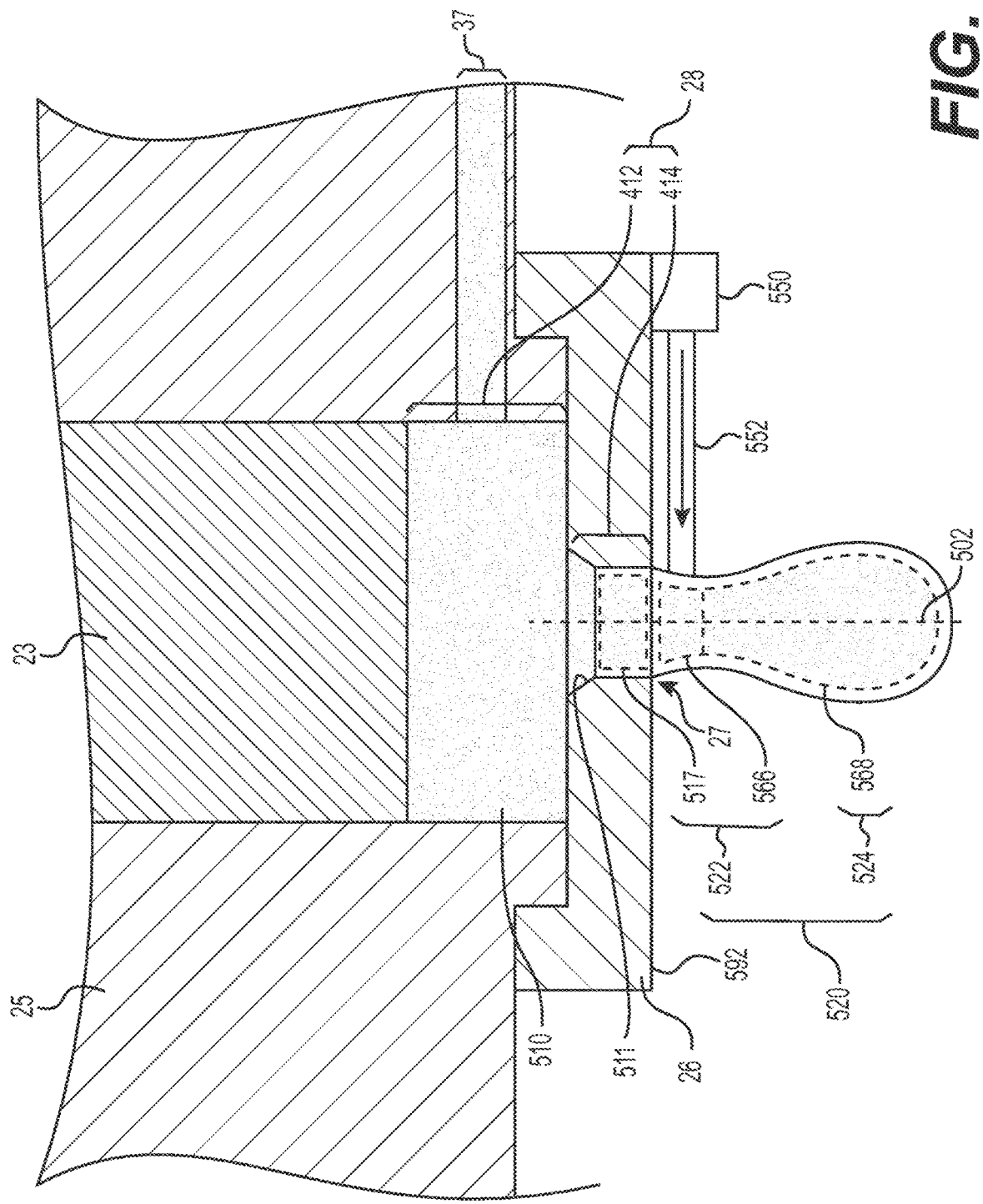

US 11,040,531 B2

JETTING DEVICES WITH ENERGY OUTPUT DEVICES AND METHODS OF CONTROLLING SAME

CROSS-REFERENCE TO RELATED APPLICATIONS

This application is a national phase under 35 U.S.C. § 371 of PCT International Application No. PCT/EP2018/067616 which has an International filing date of Jun. 29, 2018, which claims priority to Sweden Application No. 1730188-8, filed Jul. 12, 2017, the entire contents of each of which are hereby incorporated by reference.

BACKGROUND

Technical Field

Example embodiments described herein generally relate to the field of "jetting" droplets of a viscous medium onto a substrate. More specifically, the example embodiments relate to improving the performance of a jetting device, and a jetting device configured to "jet" droplets of viscous medium onto a substrate.

Related Art

Jetting devices are known and are primarily intended to be used for, and may be configured to implement, jetting droplets of viscous medium, e.g. solder paste or glue, onto a substrate, e.g. an electronic circuit board, prior to mounting of components thereon. An example of such a jetting device is disclosed in WO 99/64167, incorporated herein by reference in its entirety.

A jetting device may include a nozzle space (also referred to herein as an eject chamber) configured to contain a relatively small volume of viscous medium prior to jetting, a jetting nozzle (also referred to herein as an eject nozzle) coupled to (e.g., in communication with) the nozzle space, an impacting device configured to impact and jet the viscous medium from the nozzle space through the jetting nozzle in the form of droplets, and a feeder configured to feed the medium into the nozzle space.

Since production speed is a relatively important factor in the manufacturing of electronic circuit boards, the application of viscous medium is typically performed "on the fly" (i.e., without stopping for each location on the workpiece where viscous medium is to be deposited). A further way to improve the manufacturing speed of electronic circuit boards is to eliminate or reduce the need for operator interventions.

In some cases, good and reliable performance of the device may be a relatively important factor in the implementation of the above two measures, as well as a high degree of accuracy and a maintained high level of reproducibility during an extended period of time. In some cases, absence of such factors may lead to unintended variation in deposits on workpieces, (e.g., circuit boards), which may lead to the presence of errors in such workpieces. Such errors may reduce reliability of such workpieces. For example, unintended variation in one or more of deposit size, deposit placement, deposit shape, etc. on a workpiece that is a circuit board may render the circuit board more vulnerable to bridging, short circuiting, etc.

In some cases, good and reliable control of droplet size may be a relatively important factor in the implementation of the above two measures. In some cases, absence of such control may lead to unintended variation in deposits on workpieces, (e.g., circuit boards), which may lead to the presence of errors in such workpieces. Such errors may reduce reliability of such workpieces. For example, unintended variation in one or more of deposit size, deposit placement, deposit shape, etc. on a workpiece that is a circuit board may render the circuit board more vulnerable to bridging, short circuiting, etc.

In some cases, unintended variation in one or more of deposit size, deposit placement, deposit shape, etc. on a workpiece may be based at least in part upon variations in breakage of separate, individual droplets from the nozzle of the jetting device during jetting operations. Such variations in the breaking of separate droplets may result in variations in one or more of the deposits formed by the separate droplets, including variations in one or more of deposit size, shape, position, form, etc. Such variation may result in reduced performance of the workpiece.

U.S. Pat. No. 6,045,208 to Hirahara discloses an ink-jet recording apparatus that may record an image onto a recording medium by flying an ink-droplet from an ink surface by a pressure of an ultrasonic beam. The apparatus may include an ultrasonic generating element array that has a plurality of ultrasonic elements arranged in an array for emitting ultrasonic beams, a driving device for applying a plurality of pulses having different phases from each other, and a converging device for converging the ultrasonic beams by interfering the ultrasonic beams with each other. The generating elements may be simultaneously driven and sequentially shifted in an array direction, and the converging device may converge the ultrasonic beams in a direction perpendicular to the array direction.

SUMMARY

According to some example embodiments, a device configured to jet a droplet of a viscous medium may include a nozzle including an outlet, the nozzle configured to jet the droplet through the outlet. The device may further include an energy output device configured to direct a quantum of energy into at least a portion of the viscous medium jetted through the outlet to control a breaking of the droplet from the nozzle.

The energy output device may include an acoustic transducer configured to emit an acoustic signal into the portion of the viscous medium jetted through the outlet to control the breaking of the droplet from the nozzle, based on acoustic actuation of the portion of the viscous medium.

The acoustic actuation may include inducing shear-thinning of the portion of the viscous medium.

The nozzle may include a conduit extending from the outlet into an interior of the device. The acoustic transducer may be located at the conduit, such that the acoustic transducer is configured to emit acoustic signals that transfer acoustic waves to viscous medium passing through the conduit to the outlet.

The energy output device may include a laser emitter configured to emit a laser beam that impinges on the portion of the viscous medium jetted through the outlet to control the breaking of the droplet from the nozzle, based on at least one of imparting momentum into the portion of the viscous medium through photon pressure, inducing at least partial vaporization of the portion of the viscous medium, and inducing localized heating of the portion of the viscous medium.

The laser emitter may be located external to the nozzle, such that the laser emitter is configured to emit the laser beam to impinge upon a portion of the viscous medium that has exited the nozzle through the outlet.

The energy output device may include a piezoelectric element and may be configured to direct the quantum of energy into at least the portion of the viscous medium based on adjusting a cross-sectional flow area of the nozzle.

The energy output device may include a heater element and may be configured to direct the quantum of energy into at least the portion of the viscous medium based on generating heat.

The device may include a control device. The control device may be configured to control a viscous medium supply to move a volume of the viscous medium through the nozzle to the outlet of the nozzle to jet the droplet. The control device may be configured to control the energy output device to direct the quantum of energy into at least the portion of the viscous medium at a particular period of elapsed time after controlling the viscous medium supply to move the volume.

According to some example embodiments, a method for controlling a jetting of a droplet of a viscous medium through a nozzle may include controlling a viscous medium supply to move a volume of the viscous medium through the nozzle to an outlet of the nozzle and controlling an energy output device to deliver a quantum of energy to a first portion of the volume of the viscous medium to cause at least a separate, second portion of the volume of the viscous medium to break from the nozzle to form the droplet.

The quantum of energy may be delivered exclusively to the first portion of the volume of the viscous medium, independently of the separate, second portion of the volume of the viscous medium.

The energy output device may include an acoustic transducer. The controlling the energy output device may include controlling the acoustic transducer to emit an acoustic signal into the first portion of the viscous medium jetted through the nozzle to cause at least the separate, second portion of the volume to break from the nozzle based on acoustic actuation of the first portion of the viscous medium.

The causing at least the separate, second portion of the volume to break from the nozzle may include inducing shear-thinning in the first portion of the volume of the viscous medium based on the acoustic actuation.

The energy output device may include a laser emitter. The controlling the energy output device may include controlling the laser emitter to emit a laser beam that impinges on at least the first portion of the viscous medium jetted through the outlet to cause at least the separate, second portion of the volume to break from the nozzle, based on at least one of imparting momentum into at least the first portion of the volume through photon pressure, inducing at least partial vaporization of the first portion of the volume, and inducing localized heating of the first portion of the viscous medium.

The energy output device may include a piezoelectric element, and controlling the energy output device may include controlling the piezoelectric element to adjust a cross-sectional flow area of the nozzle.

The energy output device may include a heater element, and controlling the energy output device may include controlling the heater element to direct the quantum of energy into at least the portion of the viscous medium based on generating heat.

The controlling the energy output device may include controlling the energy output device to direct the quantum of energy into at least the first portion of the volume at a particular period of elapsed time after controlling the viscous medium supply to move the volume.

According to some example embodiments, a device configured to jet a droplet of a viscous medium may include a nozzle including an outlet, the nozzle configured to jet the droplet based on a volume of the viscous medium moving through the outlet along a longitudinal axis of the outlet; and an energy output device configured to direct a quantum of energy to intersect the longitudinal axis of the outlet, such that the energy output device is configured to direct the quantum of energy into at least a portion of the volume of the viscous medium.

The energy output device may include an acoustic transducer configured to emit an acoustic signal that intersects the longitudinal axis of the outlet.

The nozzle may include a conduit extending from the outlet into an interior of the device along the longitudinal axis of the outlet. The acoustic transducer may be configured to emit acoustic signals that transfer acoustic waves to viscous medium passing through the conduit along the longitudinal axis of the outlet.

The acoustic transducer may be configured to emit the acoustic signal that intersects the longitudinal axis of the outlet to control the breaking of the droplet from the nozzle, based on acoustic actuation of at least a portion of the volume of the viscous medium.

The acoustic actuation includes inducing shear-thinning of the portion of the viscous medium.

The energy output device includes a laser emitter configured to emit a laser beam that that intersects the longitudinal axis of the outlet.

The laser emitter is configured to emit the laser beam that intersects the longitudinal axis of the outlet to control the breaking of the droplet from the nozzle, based on at least one of imparting momentum into at least a portion of the volume of the viscous medium through photon pressure, inducing at least partial vaporization of at least the portion of the volume of the viscous medium, and inducing localized heating of at least the portion of the viscous medium.

The laser emitter is located external to the nozzle, such that the laser emitter is configured to emit the laser beam to impinge upon a portion of the viscous medium that has exited the nozzle through the outlet.

The energy output device may include a piezoelectric element and may be configured to emit a mechanical signal that intersects the longitudinal axis of the outlet.

The energy output device may include a heater element and may be configured emit a thermal signal that intersects the longitudinal axis of the outlet.

The device may include a control device. The control device may be configured to control a viscous medium supply to move the volume of the viscous medium through the nozzle to the outlet of the nozzle to jet the droplet. The control device may be configured to control the energy output device to direct the quantum of energy to intersect the longitudinal axis of the outlet at a particular period of elapsed time after controlling the viscous medium supply to move the volume.

According to some example embodiments, a method for controlling a jetting of a droplet of a viscous medium through a nozzle may include controlling a viscous medium supply to move a volume of the viscous medium through the nozzle to an outlet of the nozzle along a longitudinal axis of the outlet. The method may include controlling an energy output device to deliver a quantum of energy to intersect the longitudinal axis of the outlet such that the quantum of energy is delivered into a first portion of the volume of the viscous medium subsequently to a separate, second portion of the volume of the viscous medium exiting the nozzle through the outlet.

The quantum of energy may be delivered exclusively to the first portion of the volume of the viscous medium, independently of the separate, second portion of the volume of the viscous medium.

The controlling the energy output device includes controlling the energy output device to direct the quantum of energy to intersect the longitudinal axis of the outlet at a particular period of elapsed time after controlling the viscous medium supply to move the volume.

BRIEF DESCRIPTION OF THE DRAWINGS

Some example embodiments will be described with regard to the drawings. The drawings described herein are for illustration purposes only and are not intended to limit the scope of the present disclosure in any way.

FIG. 5B is a sectional view of a portion of the jetting device illustrated in FIG. 4 according to some example embodiments of the technology disclosed herein.

DETAILED DESCRIPTION

Figure 1:
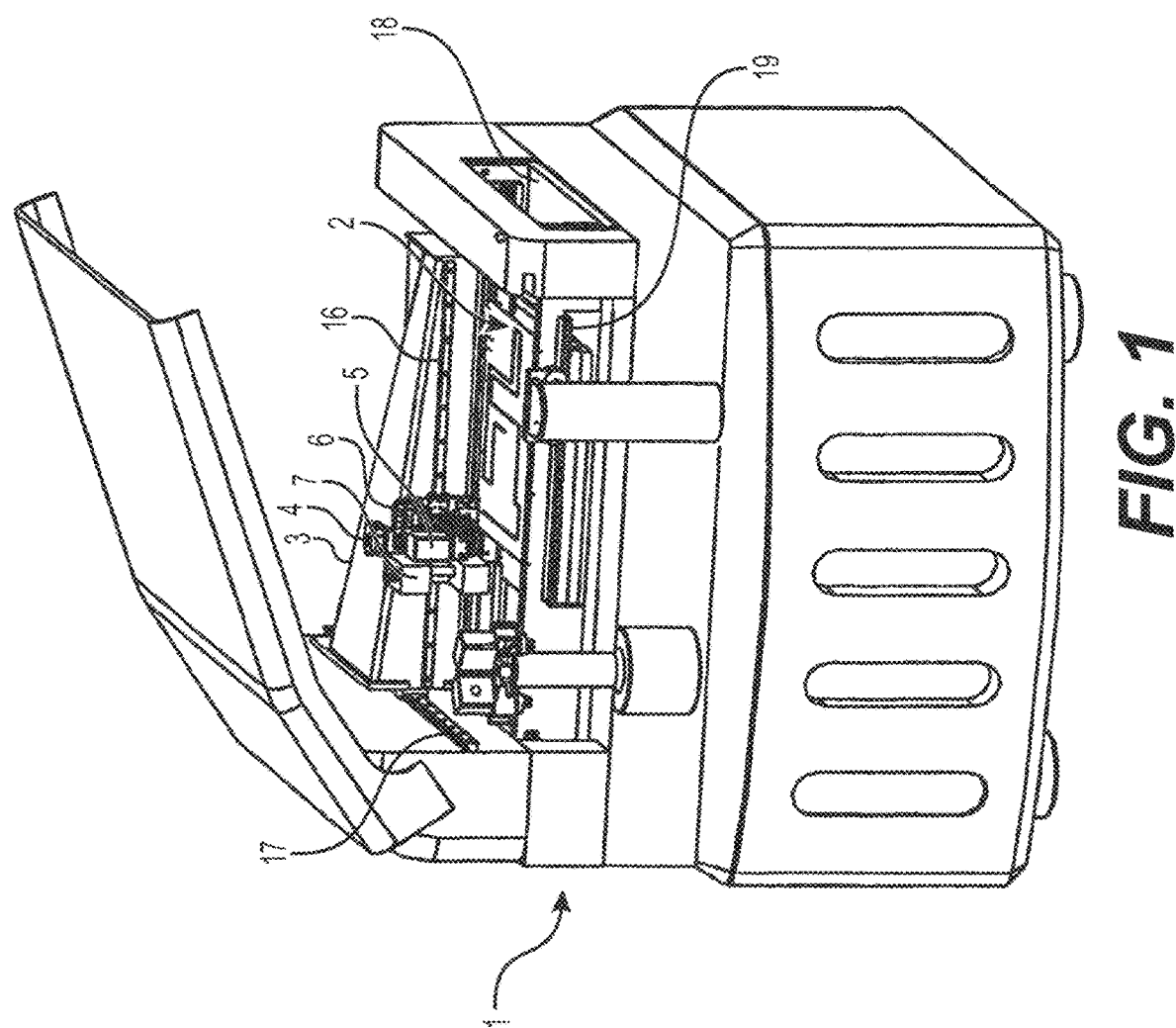
FIG. 1 is a perspective view illustrating a jetting device 1 according to some example embodiments of the technology disclosed herein.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only the example embodiments set forth herein.

It should be understood, that there is no intent to limit example embodiments to the particular ones disclosed, but on the contrary example embodiments are to cover all modifications, equivalents, and alternatives falling within the appropriate scope. Like numbers refer to like elements throughout the description of the figures.

Example embodiments of the technology disclosed herein are provided so that this disclosure will be thorough, and will fully convey the scope to those who are skilled in the art. Numerous specific details are set forth such as examples of specific components, devices, and methods, to provide a thorough understanding of implementations of the technology disclosed herein. It will be apparent to those skilled in the art that specific details need not be employed, that example embodiments of the technology disclosed herein may be embodied in many different forms and that neither should be construed to limit the scope of the disclosure. In some example embodiments of the technology disclosed herein, well-known processes, well-known device structures, and well-known technologies are not described in detail.

The terminology used herein is for the purpose of describing particular example embodiments of the technology disclosed herein only and is not intended to be limiting. As used herein, the singular forms "a", "an" and "the" may be intended to include the plural forms as well, unless the context clearly indicates otherwise. The terms "comprises," "comprising," "includes," "including," "has," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, regions, layers and/or sections should not be limited by these terms. These terms may be only used to distinguish one element, component, region, layer and/or section from another region, layer and/or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments of the technology disclosed herein.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As discussed herein, "viscous medium" may be solder paste, flux, adhesive, conductive adhesive, or any other kind ("type") of medium used for fastening components on a substrate, conductive ink, resistive paste, or the like. However, example embodiments of the technology disclosed herein should not be limited to only these examples.

A "substrate" may be a board (e.g., a printed circuit board (PCB) and/or a flexible PCB), a substrate for ball grid arrays (BGA), chip scale packages (CSP), quad flat packages (QFP), wafers, flip-chips, or the like.

It is also to be noted that the term "jetting" should be interpreted as a non-contact dispensing process that utilizes a fluid jet to form and shoot one or more droplets of a viscous medium from a jet nozzle onto a substrate, as compared to a contact dispensing process, such as "fluid wetting."

The term "gaseous flow" should be interpreted as a flow of air, compressed air, gas of any suitable type, such as nitrogen, or any other medium of a gaseous type.

The term "deposit" may refer to a connected amount of viscous medium applied at a position on a workpiece as a result of one or more jetted droplets.

For some example embodiments, the solder paste may include between about 40% and about 60% by volume of solder balls and the rest of the volume is solder flux.

In some example embodiments, the volume percent of solder balls of average size may be in the range of between about 5% and about 40% of the entire volume of solid phase material within the solder paste. In some example embodiments, the average diameter of the first fraction of solder balls may be within the range of between about 2 and about 5 microns, while the average diameter of a second fraction of solder balls may be between about 10 and about 30 microns.

The term "deposit size" refers to the area on the workpiece, such as a substrate, that a deposit will cover. An increase in the droplet volume generally results in an increase in the deposit height as well as the deposit size.

In the context of the present application, it is to be noted that the term "viscous medium" should be understood as solder paste, solder flux, adhesive, conductive adhesive, or any other kind of medium of fluid used for fastening components on a substrate, conductive ink, resistive paste, or the like, and that the term "jetted droplet", or "shot" should be understood as the volume of the viscous medium that is forced through the jetting nozzle and moving towards the substrate in response to an impact of the impacting device. The jetted droplet may also include a cluster of droplets jetted due to an impact of the impacting device. It is also to be noted that the term "deposit", or a volume of "deposited medium", refers to a connected amount of viscous medium applied at a position on a substrate as a result of one or more jetted droplets, and that the term "substrate" should be interpreted as a printed wiring board (PWD), a printed circuit board (PCB), a substrate for ball grid arrays (BGAs), chip scale packages (CSP), quad flat packages (QFP), wafers, flip-chips, or the like.

It is also to be noted that the term "jetting" should be interpreted as a non-contact dispensing process that utilises a fluid jet to form and shoot droplets of a viscous medium from a jetting nozzle onto a substrate, as to compare to a contact dispensing process, such as "fluid wetting".

In certain aspects of the technology disclosed, the device performing the method defined by the claims is a software controlled ejector. The software needs instructions for how to apply the viscous medium to a specific substrate or according to a predetermined jetting schedule or jetting process. These instructions are called a "jetting program". Thus, the jetting program supports the process of jetting droplets of viscous medium onto the substrate, which process also may be referred to as "jetting process" or "printing process". The jetting program may be generated by a pre-processing step performed off-line, prior to the jetting process.

Thus, the generation of the jetting program involves importing, to a generation program, substrate data relating to a unique or predetermined substrate, or a unique or predetermined set of identical substrates; and defining, on basis of the substrate data, where on the substrate the droplets are to be jetted. In other words, viscous medium is arranged to be jetted onto the substrate according to a predetermined jetting program.

As an example, a computer program is used for importing and processing CAD data or the like about a substrate. The CAD data may e.g. comprise data representing position and extension of contact pads, as well as data representing position, name, and leads of each individual component that is to be mounted on the substrate. The program can be used to determine where on the substrate the droplets are to be jetted, such that each component is provided with deposits having the required volume, lateral extension, and/or height. This is a process which requires knowledge of the size and volume of a single droplet, how many droplets that will be sufficient for covering the needs of a specific component, and where on the substrate each droplet should be placed.

When all droplet configurations for all components have been programmed, a jetting path template may be generated, which describes how the jetting nozzle is going to be moved, e.g. by a jetting machine operating one or more ejectors, in order to jet the droplets of viscous medium onto the substrate. It is understood that the ejectors may operate concurrently or consecutively. The jetting path template is transferred to the jetting program which is used for running the jetting machine, and hence the ejector(s), accordingly. The jetting program may also comprise jetting parameters, e.g. for controlling the feeding of the viscous medium into the nozzle space, and for controlling the impact of the impacting device, in order to provide the substrate with the required deposits.

The pre-processing step that generates the jetting program may involve some manual steps performed by an operator. This may e.g. involve importing the CAD data and determining where on a pad the droplets should be positioned for a specific component. It will however be realized that the preprocessing may be performed automatically by e.g. a computer.

In some example embodiments of the technology disclosed herein, a jetting device that is configured to jet one or more droplets of a viscous medium on to a substrate may include a nozzle including an outlet, where the nozzle configured to jet the one or more droplets through the outlet. The jetting device may further include an energy output device. The energy output device may be configured to direct a quantum of energy (also referred to as a discrete amount of energy and/or a determined amount of energy) to intersect a longitudinal axis of the outlet. The energy output device may be configured to direct the quantum of energy into at least a portion of the volume of the viscous medium jetted through the outlet. The energy output device may be configured to direct a quantum of energy into at least a portion of the viscous medium jetted through the outlet to control a breaking of the droplet from the nozzle. Such a portion of the viscous medium may be referred to herein as a "local viscous medium."

In some example embodiments, an energy output device is configured to control a break-off of a droplet of viscous medium from the nozzle based on directing a quantum of energy into at least the local viscous medium. Such control may be provided based on one or more various mechanisms and/or forms in which the energy is delivered to the local viscous medium. Such various mechanisms may be referred to collectively herein as "forcing mechanisms."

As described further below, the "local viscous medium" into which an energy output device may direct a quantum of energy may be a portion of viscous medium that at least partially comprises a filament connecting a droplet of viscous medium and a remainder portion of viscous medium located within the jetting device. To control the break-off of the droplet from the nozzle, the energy output device may deliver the quantum of energy into the local viscous medium to induce the break-off of the droplet from the nozzle to occur at a specific point on the filament.

In some example embodiments, the energy output device may be controlled to deliver a quantum of energy that includes a particular amount of energy and/or a particular rate of energy delivery at a particular point in time and over a particular period of elapsed time. One or more of the amount of energy, rate of energy delivery, time of initiation of energy delivery, and/or period of elapsed time of energy delivery may be controlled. Such control may result in controlling a time and/or manner in which a droplet of viscous medium breaks off from the nozzle.

In some example embodiments, the energy output device includes at least one acoustic transducer. The acoustic transducer may be configured to emit acoustic signals that transfer acoustic waves to at least a portion of viscous medium that is located in and/or is flowing through the portion of the viscous medium conduit. Such a viscous medium with which the acoustic transducer is configured to transfer acoustic waves via emitted acoustic signals may be referred to herein as the local viscous medium in relation to the acoustic transducer.

An acoustic transducer may be configured to deliver a quantum of energy that is included in an acoustic signal emitted by the acoustic transducer. The acoustic transducer may be configured to deliver a quantum of energy into a portion of the viscous medium ("local viscous medium") based on the acoustic transducer emitting an acoustic signal that transfers acoustic waves into the local viscous medium. The acoustic signal may induce acoustic actuation of one or more portions of at least the local viscous medium.

In some example embodiments, the acoustic signal is an ultrasonic signal (e.g., an acoustic signal having a frequency greater than 20,000 hertz), such that the acoustic transducer that is configured to emit the ultrasonic signal may be referred to as an "ultrasonic transducer." However, it will be understood that the acoustic transducer, as described herein, is not limited to generating acoustic signals that are ultrasonic signals. For example, an acoustic transducer as described herein may be configured to generate acoustic signals having a frequency between 20 hertz and 20,000 hertz. In another example, an acoustic transducer as described herein may be configured to generate acoustic signals having a frequency that is less than 20 hertz (e.g., infrasonic signals), such that the acoustic transducer may be referred to as an infrasonic transducer.

In some example embodiments, an acoustic transducer may control the break-off of a droplet of viscous medium from the nozzle (also referred to as control of the breaking of the droplet from the nozzle) based on acoustic actuation of at least the local viscous medium that at least partially comprises a droplet filament through emitting an acoustic signal into the local viscous medium. The acoustic signal may induce acoustic actuation of at least the local viscous medium.

The acoustic actuation of the local viscous medium may induce shear thinning of at least a portion of the local viscous medium. For example, where the viscous medium is a suspension of one or more particles in a carrier fluid, including a Non-Newtonian fluid, the acoustic actuation of the local viscous medium may include inducing shear thinning of the carrier fluid. In another example, where the viscous medium is a homogenous fluid, including a Non-Newtonian fluid, the acoustic actuation of the local viscous medium may include inducing shear thinning of the homogenous fluid.

In some example embodiments, if and/or when the viscous medium is a suspension of particles in a carrier fluid, the acoustic actuation of the local viscous medium may induce a localized depletion of a volume fraction in local viscous medium based on oscillatory segregation of particles. Restated, the introduction of an acoustic signal on a local viscous medium that includes a suspension may induce the ordered movement of the particles of the suspension and form a depletion area in the volume where the volume fraction is lower than in the immediate proximity (e.g., a separate portion of the viscous medium that is external to the local viscous medium).

Acoustic actuation of the local viscous medium may induce a break-off of the filament that connects the droplet to the nozzle, based at least in part upon shear-thinning of the local viscous medium that at least partially comprises the filament. The size and/or shape of the droplet may be controlled based on controlling at least one of the timing (e.g., initiation time and/or period of energy delivery) and the amount of energy included in the acoustic signal(s) emitted by the acoustic transducer. As a result, based on controlling an acoustic transducer, the break-off of a droplet from the nozzle may be more accurately and precisely controlled.

In some example embodiments, the energy output device includes at least one laser emitter. The laser emitter may be located at a position in and/or on the jetting device such that the laser emitter is configured to emit and/or direct a laser beam that intersects a longitudinal axis of an outlet of the nozzle of the jetting device. Such a position may be on an external surface of the jetting device, such that the laser emitter is fixed to the external surface of the jetting device.

The laser emitter may be configured to emit and/or direct a laser beam to impinge on at least a portion of the viscous medium jetted from an outlet of the nozzle of the jetting device. The portion of viscous medium that is impinged by the laser beam may also be referred to as the local viscous medium in relation to the laser emitter.

The laser emitter may be configured to deliver a quantum of energy that is included in the laser beam into the local viscous medium based on emitting and/or directing the laser beam. The laser beam may impart momentum into the local viscous medium based on photon pressure (also referred to as photonic pressure, radiation force, radiation pressure, or the like), such that the laser beam may induce shear between the local viscous medium and an adjacent portion of viscous medium to cause the adjacent portion of viscous medium to break from the local viscous medium. The laser beam may heat and/or at least partially vaporize the local viscous medium based on energy transfer from the laser beam into the local viscous medium, thereby inducing a break-off between the local viscous medium and another adjacent portion of viscous medium.

In some example embodiments, the laser emitter may be configured to deliver a quantum of energy that is included in the laser beam into the local viscous medium based on emitting and/or directing the laser beam, where the laser beam may induce localized heating of the local viscous medium. Localized heating of the local viscous medium may induce a change in one or more properties of the local viscous medium, including, for example, a reduction in viscosity. Such a localized change in in one or more properties of the local viscous medium may induce localized break-off of a droplet of viscous medium at the local viscous medium. In some example embodiments, the laser beam may induce localized heating of the local viscous medium without inducing at least partial vaporization of the local viscous medium.

In some example embodiments, where an energy output device is a laser emitter, the laser emitter may control the break-off of a droplet of viscous medium from the nozzle (also referred to as control of the breaking of the droplet from the nozzle) based on at least one of imparting momentum into a local viscous medium through photon pressure, inducing localized heating of the local viscous medium, and inducing at least partial vaporization of the local viscous medium.

One or more of imparting momentum into a local viscous medium through photon pressure, inducing localized heating of the local viscous medium, and inducing at least partial vaporization of the local viscous medium may induce a break-off of the filament that connects the droplet to the nozzle. The size and/or shape of the droplet may be controlled based on controlling at least one of the timing (e.g., initiation time and/or period of energy delivery) and the amount of energy included in the laser beam emitted by the laser emitter. As a result, based on controlling a laser emitter, the break-off of a droplet from the nozzle may be more accurately and precisely controlled.

In some example embodiments, the laser emitter may be configured to emit a laser beam having a wavelength that is in one or more particular ranges of wavelengths. For example, in some example embodiments the laser emitter is an infrared laser emitter that is configured to emit an infrared laser beam that includes at least one of near-infrared light and far-infrared light.

In some example embodiments, by utilizing a forcing mechanism (e.g., acoustic actuation, photon pressure, viscous medium vaporization, some combination thereof, etc.) on a local viscous medium, one or more properties of the local viscous medium that at least partially comprises a droplet filament (also referred to herein as simply a "filament") may be adjusted. Such properties may include one or more rheological properties, including viscosity.

Such an adjustment of one or more properties of the local viscous medium may result in inducing a focused point of breakoff of a droplet from the nozzle. For example, the local viscous medium may at least partially comprise a filament of viscous medium that is formed during droplet jetting (e.g., droplet formation), such that the filament of viscous medium connects the droplet to the nozzle. The local viscous medium may thus be a relatively small and focused amount of viscous medium in relation to the droplet. Adjustment of one or more properties of the local viscous medium, based on delivering a quantum of energy to the local viscous medium, may induce a focused point of break-off at the filament to cause the droplet to break off from the nozzle.

Restated, the delivery of a quantum of energy to the local viscous medium, where the local viscous medium at least partially comprises a droplet filament, may cause a localized rheological adjustment to the filament to implement localized and temporally synchronized rheological perturbations to induce detailed spatial droplet break-off localization at the filament.

In some example embodiments, inducing ("introducing") a spatially and temporally well-defined break-off point at the filament of a droplet of the viscous medium may improve control over the volumetric variation of the droplets, as well as improve control over the variation in positioning of the droplets on a workpiece (e.g., control over the specific position at which a jetted droplet lands on a workpiece). As a result, such volumetric variation and position variation may be reduced, thereby improving the accuracy and precision of droplet size and positioning control.

In addition, inducing a well-defined break-off point may reduce a number (quantity) of satellite droplets of the viscous medium, which may thus reduce the occurrence of unintended satellite deposits on the workpiece. As referred to herein, satellite droplets may refer to relatively small droplets that may be formed based on the breaking of a larger droplet from the nozzle. Such satellite droplet formation may result from non-localized breaking of the filament. Such satellite droplets may land in various locations on the workpiece and may contribute to reduced performance of the workpiece (e.g., via inducing electrical shorts and/or bridges across the workpiece). A reduction in the occurrence of satellite droplets on the workpiece may result in an improvement in the performance and/or reliability of the workpiece, and thus an improvement in the lifetime of the workpiece, as the potential for errors and/or damage incurred as a result of the presence of the satellite deposit (e.g., electrical shorts across the satellite deposits) is reduced based on the improved control over the break-off point on the filaments of droplets jetted on the workpiece.

In some example embodiments, inducing ("introducing") a spatially and temporally well-defined break-off point on the filament of a droplet of the viscous medium may improve the uniformity of jetted droplets and thus may reduce unintended variations in the properties (e.g., size, shape, etc.) of the droplets, through the improved controlled point of separation ("break-off") for the each individual droplet being formed. In addition, the improved control over the droplet break-off may result in improved positioning accuracy, that is, improved accuracy of the positioning of a droplet on a workpiece, based on allowing for a predictable break-off point in the viscous medium filament. Such improved positioning accuracy and droplet uniformity may result in an improvement in the performance and/or reliability of the workpiece on which the droplets are jetted to form deposits, and thus an improvement in the lifetime of the workpiece, as the potential for errors and/or damage incurred as a result of unintended variations in deposit properties (e.g., electrical shorts across a deposit that is larger than intended due to sub-optimal droplet control) is reduced based on the improved control over the break-off point on the filaments of droplets jetted on the workpiece.

In addition, the control over droplet break-off based on delivering a quantum of energy to a local viscous medium that at least partially comprises the droplet filament, via acoustic signals and/or laser beams, may enable improved control over jetted droplets of relatively high-viscosity viscous media that are relatively insensitive to capillary effects, thereby addressing a problem of inducing droplet filament break-off for relatively high-viscosity fluids that are insensitive to capillary effects. Unlike filament break-off control solutions that introduce fluid filament break-off through the utilization and/or leveraging of capillary forces, the control over droplet break-off enabled by some example embodiments where the jetting device includes one or more energy output devices as described herein enables control over droplet filament break-off for relatively viscous media where capillary forces are not dominant.

In some example embodiments, a jetting device that includes at least one energy output device as described above may be configured to provide improved uniformity and positioning accuracy and precision with regards to deposits formed on a workpiece, in relation to jetting devices from which such energy output devices are absent. This is at least partially based upon the at least one energy output device enabling controlled spatial and temporal localization of filament break-off to a particular local viscous medium, relative to jetting devices in which such an energy output device is absent. As a result, a jetting device that includes the at least one energy output device as described above may be configured to jet droplets having improved uniformity and/or precision in size and/or positioning, relative to jetting devices from which such energy output devices are absent.

In addition, a jetting device that includes at least one energy output device as described above may be configured to provide improved uniformity and positioning accuracy and precision with regards to droplets of relatively high-viscosity fluids (e.g., viscous medium), relative to devices configured to jet droplets of relatively low-viscosity fluids. In contrast of device that may use energy output devices to control the jetting of droplets of relatively low-viscosity fluids, where such control may include leveraging capillary forces to induce droplet break-off, a jetting device that includes at least one energy output device as described above may be configured to enable droplet break-off control for relatively high-viscosity fluids where capillary forces are not dominant (e.g., fluids that are capillary force insensitive), including Non-Newtonian fluids. A jetting device that includes at least one energy output device as described above may therefore be configured to jet relatively uniform and properly-positioned droplets of relatively high-viscosity fluids, relative to devices configured to jet droplets of fluids having relatively low-viscosity.

In addition, a jetting device that includes at least one energy output device as described above may be configured to provide improved uniformity and positioning accuracy and precision with regards to droplets of viscous medium, in relation to jetting devices that may include one or more energy output devices configured to cause ink droplets to fly from an ink surface according to photonic pressure. A jetting device that includes at least one energy output device as described above, by directing a quantum of energy into a local viscous medium that at least partially comprises a droplet filament, may enable improved control of the spatial and temporal localization of filament break-off and/or droplet break-off, relative to a device that uses energy output devices to move ink droplets according to photonic pressure.

As a result of the advantages noted above, a jetting device that includes one or more of the energy output devices as described above may be configured to form deposits on a workpiece to form a board, where the deposits have reduced unintended variation (e.g., improved uniformity, improved repeatability, improved reliability, etc.) in size, form, and/or position based on improved control over the spatial and temporal localization of filament break-off for each droplet as enabled by the one or more energy output devices. The board may therefore have reduced susceptibility to errors (e.g., short-circuits across deposits) that may otherwise result from unintended variation in deposits on the board. Thus, a jetting device that includes one or more of the energy output devices as described above may at least partially mitigate and/or solve the problem of reduced reliability, performance, and/or lifetime of boards generated via deposits formed on a workpiece via jetting one or more strips of droplets, where the reduced reliability is based on unintended variations in position, form and/or size of the deposits caused by spatial and/or temporal variation in droplet break-off and/or filament break-off across various droplets jetted during a jetting operation.

In some example embodiments, a jetting device that includes at least one energy output device as described above may be configured to reduce the occurrence of satellite droplets being formed on a workpiece, in relation to jetting devices in which such energy output devices are absent. This is at least partially based upon the at least one energy output device enabling controlled spatial and temporal localization of filament break-off to a particular local viscous medium, relative to jetting devices from which such an energy output device is absent. As a result, a jetting device that includes the at least one energy output device as described above may be configured to reduce and/or prevent the formation of satellite droplets, relative to jetting devices from which such energy output devices are absent.

In addition, a jetting device that includes at least one energy output device as described above may be configured to reduce the occurrence of satellite droplets being formed on a workpiece, in relation to jetting devices that may include one or more energy output devices configured to cause ink droplets to fly from an ink surface according to photonic pressure. A jetting device that includes at least one energy output device as described above, by enabling improved control of the spatial and temporal localization of filament break-off and/or droplet break-off, may be configured to at least partially mitigate and/or prevent the formation of satellite droplets as a result of the break-off, relative to a device that uses energy output devices to move ink droplets according to photonic pressure.

As a result of the advantages noted above, a jetting device that includes one or more of the energy output devices as described above may be configured to form deposits on a workpiece to form a board, where the board includes a reduced and/or inhibited quantity and/or concentration of unintended satellite deposits, based on the improved droplet break-off control enabled by the at least one energy output device. The board may therefore have reduced susceptibility to errors (e.g., short-circuits across deposits) that may otherwise result from unintended satellite deposits on the board. Thus, a jetting device that includes one or more of the energy output devices as described above may at least partially mitigate and/or solve the problem of reduced reliability of boards generated via deposits on a substrate, where the reduced reliability is based on the occurrence and/or formation of satellite deposits caused by non-localized filament break-off.

As referred to herein, "filament break-off," "break-off of a filament," and the like, and "droplet break-off," "break-off of a droplet," and the like may be used interchangeably.

FIG. 1 is a perspective view illustrating a jetting device 1 according to some example embodiments of the technology disclosed herein. The jetting device 1 may be configured to dispense ("jet") one or more droplets of a viscous medium onto a substrate (e.g., board 2) to generate ("establish," "form," "provide," etc.) a board 2 having one or more deposits therein. The above "dispensing" process performed by the jetting device 1 may be referred to as "jetting."

For ease of description, the viscous medium may hereinafter be referred to as solder paste, which is one of the alternatives defined above. For the same reason, the substrate may be referred to herein as an electric circuit board and the gas may be referred to herein as air.

In some example embodiments, including the example embodiments illustrated in FIG. 1, the jetting device 1 includes an X-beam 3 and an X-wagon 4. The X-wagon 4 may be connected to the X-beam 3 via an X-rail 16 and may be reciprocatingly movable (e.g., configured to be moved reciprocatingly) along the X-rail 16. The X-beam 3 may be reciprocatingly movably connected to a Y-rail 17, the X-beam 3 thereby being movable (e.g., configured to be moved) perpendicularly to the X-rail 16. The Y-rail 17 may be rigidly mounted in the jetting device 1. Generally, the above-described movable elements may be configured to be moved based on operation of one or more linear motors (not shown) that may be included in the jetting device 1.

In some example embodiments, including the example embodiments illustrated in FIG. 1, the jetting device 1 includes a conveyor 18 configured to carry the board 2 through the jetting device 1, and a locking device 19 for locking the board 2 when jetting is to take place.

A docking device 8 may be connected to the X-wagon 4 to enable releasable mounting of an assembly 5 at the docking device 8. The assembly 5 may be arranged for dispensing droplets of solder paste, i.e. jetting, which impact and form deposits on the board 2. The jetting device 1 also may include a vision device 7. In some example embodiments, including the example embodiments illustrated in FIG. 1, the vision device is a camera. The camera 7 may be used by a control device (not shown in FIG. 1) of the jetting device 1 to determine the position and/or rotation of the board 2 and/or to check the result of the dispensing process by viewing the deposits on the board 2.

In some example embodiments, including the example embodiments illustrated in FIG. 1, the jetting device 1 includes a flow generator 6. In some example embodiments, including the example embodiments illustrated in FIG. 1, the flow generator 6 is a vacuum ejector (also referred to herein as a "vacuum pump") that is arranged ("located," "positioned," etc.) on the X-wagon 4, and a source of compressed air (not shown). The flow generator 6, as well as the source of compressed air, may be in communication with the docking device 8 via an air conduit interface which may be connectable to a complementary air conduit interface. In some example embodiments, the air conduit interface may include input nipples 9 of the docking device 8, as shown in FIG. 2.

As understood by those skilled in the art, the jetting device 1 may include a control device (not explicitly shown in FIG. 1) configured to execute software running the jetting device 1. Such a control device may include a memory storing a program of instructions thereon and a processor configured to execute the program of instructions to operate and/or control one or more portions of the jetting device 1 to perform a "jetting" operation.

In some example embodiments, the jetting device 1 may be configured to operate as follows. The board 2 may be fed into the jetting device 1 via the conveyor 18, upon which the board 2 may be placed. If and/or when the board 2 is in a particular position under the X-wagon 4, the board 2 may be fixed with the aid of the locking device 19. By means of the camera 7, fiducial markers may be located, which markers are prearranged on the surface of the board 2 and used to determine the precise position thereof. Then, by moving the X-wagon over the board 2 according to a particular (or, alternatively, predetermined, pre-programmed, etc.) pattern and operating the jetting assembly 5 at predetermined locations, solder paste is applied on the board 2 at the desired locations. Such an operation may be at least partially implemented by the control device that controls one or more portions of the jetting device 1 (e.g., locating the fiducial markers via processing images captured by the camera 7, controlling a motor to cause the X-wagon to be moved over the board 2 according to a particular pattern, operating the jetting assembly 5, etc.).

Figure 2:
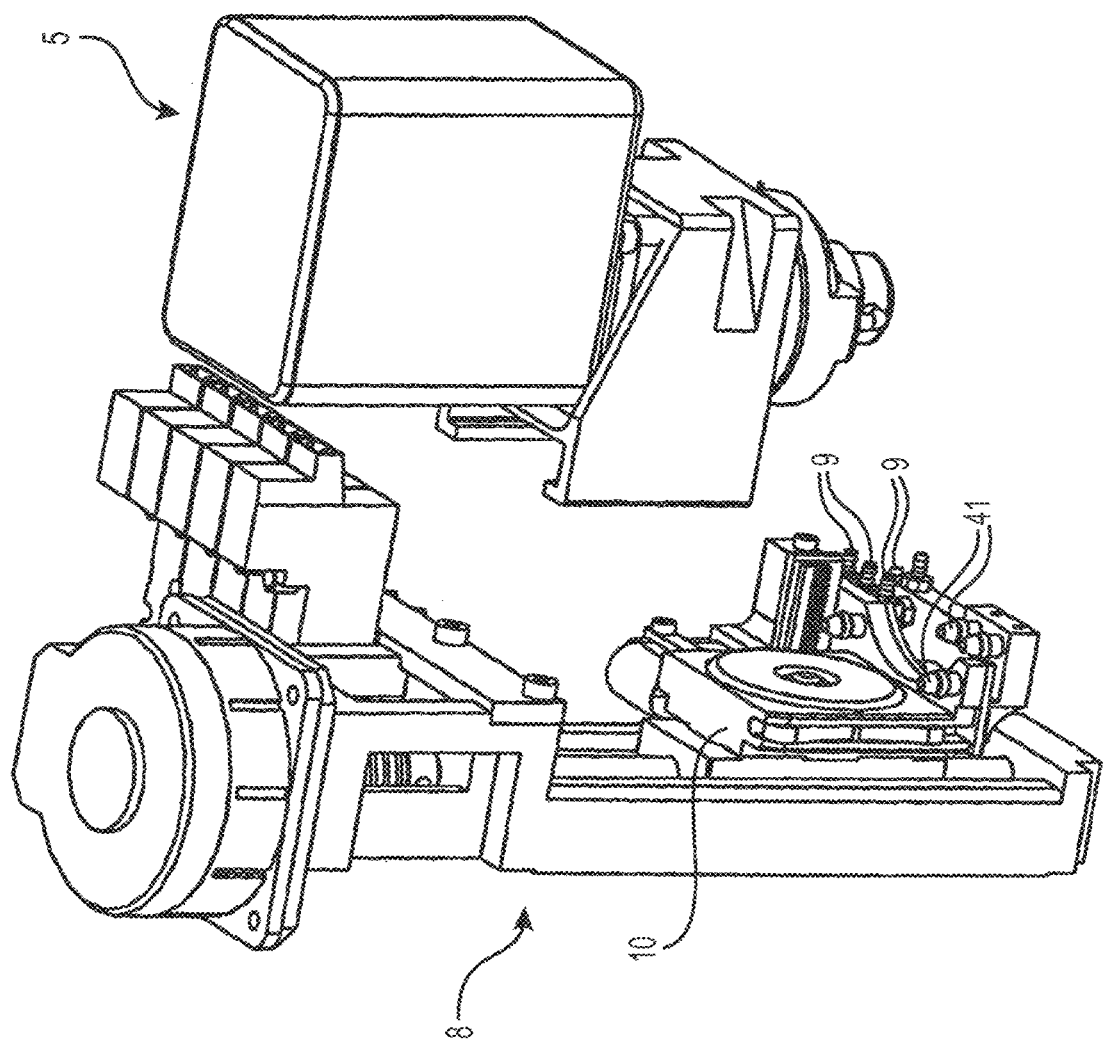
FIG. 2 is a schematic view illustrating a docking device and a jetting assembly according to some example embodiments of the technology disclosed herein.
Figure 3:
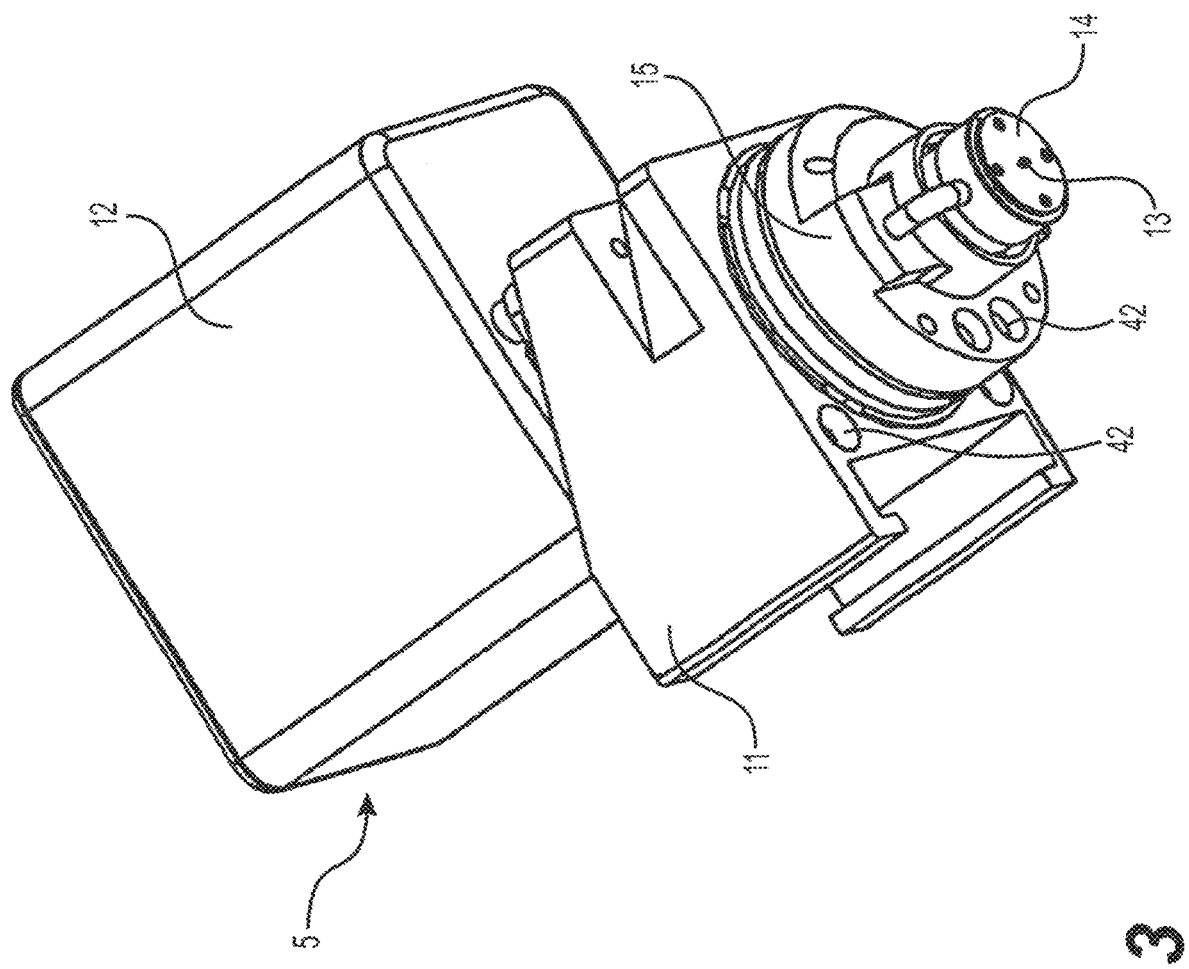
FIG. 3 is a schematic view illustrating a jetting assembly according to some example embodiments of the technology disclosed herein.

FIG. 2 is a schematic view illustrating a docking device 8 and a jetting assembly 5 according to some example embodiments of the technology disclosed herein. FIG. 3 is a schematic view illustrating a jetting assembly 5 according to some example embodiments of the technology disclosed herein. The docking device 8 and jetting assembly 5 may be included in one or more example embodiments of a jetting device 1, including the jetting device 1 illustrated in FIG. 1.

In some example embodiments, including the example embodiments illustrated in FIGS. 2-3, a jetting assembly 5 may include an assembly holder 11 configured to connect the jetting assembly 5 to an assembly support 10 of the docking device 8. Further, in some example embodiments, the jetting assembly 5 may include a supply container 12 configured to provide a supply of solder paste, and an assembly housing 15. The jetting assembly 5 may be connected to the flow generator 6 and the source of pressurized air via a pneumatic interface comprising inlets 42, positioned (e.g., "configured") to interface in airtight engagement with a complementary pneumatic interface comprising outlets 41, of the docking device 8.

Figure 4:
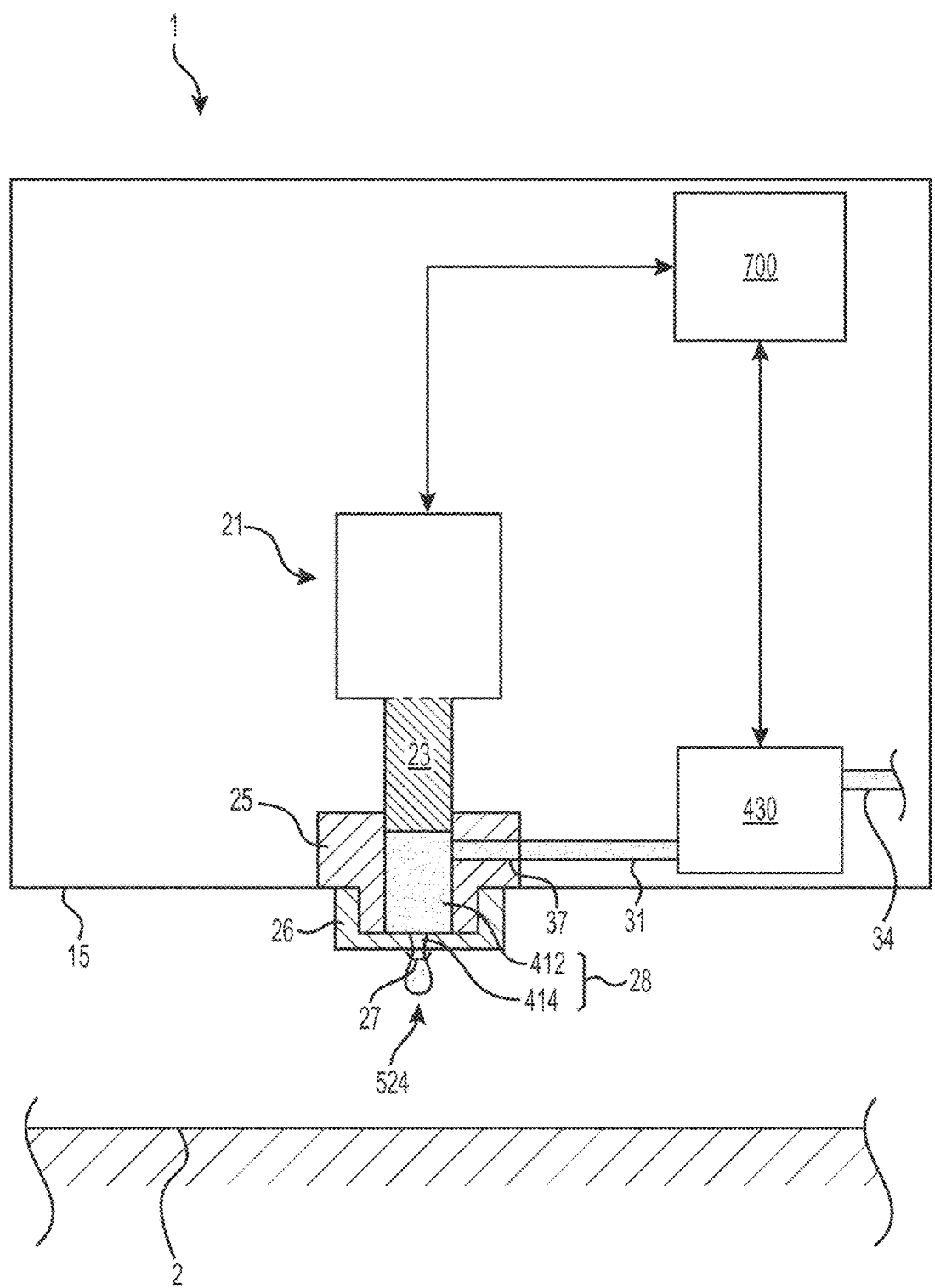
FIG. 4 is a sectional view of a portion of a jetting device according to some example embodiments of the technology disclosed herein.

FIG. 4 is a sectional view of a portion of a jetting device 1 according to some example embodiments of the technology disclosed herein.

With reference now to FIG. 4, the contents and function of the device enclosed in the assembly housing will be explained in greater detail. In some example embodiments, including the example embodiments illustrated in FIG. 4, the jetting device 1 may include an actuator locking screw for supporting an actuator in the assembly housing 15, and a piezoelectric actuator 21 (also referred to herein as simply an "actuator 21") formed by (e.g., at least partially comprising") a number ("quantity") of thin, piezoelectric elements stacked together to form ("at least partially comprise") the actuator 21. The actuator 21 may be rigidly connected to the locking screw.

In some example embodiments, including the example embodiments illustrated in FIG. 4, the jetting device 1 further includes a bushing 25 rigidly connected to the assembly housing 15, and a plunger 23 rigidly connected to the end of the actuator 21, and may be opposite the position of the locking screw. The plunger 23 is axially movable while slidably extending through a bore in the bushing 25. The jetting device 1 may include cup springs that are configured to resiliently balance the plunger 23 against the assembly housing 15, and to provide a preload for the actuator 21.

In some example embodiments, the jetting device 1 includes a control device 700. The control device 700 may be configured to apply a drive voltage intermittently to the piezoelectric actuator 21, thereby causing an intermittent extension thereof and hence a reciprocating movement of the plunger with respect to the assembly housing 15, in accordance with solder pattern printing data. Such data may be stored in a memory included in the control device. The drive voltage may be described further herein as including and/or being included in a "control signal," including an "actuator control signal."

In some example embodiments, including the example embodiments illustrated in FIG. 4, the jetting device 1 includes an eject nozzle 26 configured to be operatively directed against the board 2, onto which one or more droplets of solder paste may be jetted. The nozzle 26 may include a jetting orifice (e.g., outlet 27) through which the droplets may be jetted. The surfaces of the nozzle 26 surrounding the outlet 27 and facing the board 2 (e.g., the bottom surfaces of the nozzle 26 surrounding the jetting orifice in the example embodiments illustrated in FIG. 4) will be referred to herein as a jetting outlet. The plunger 23 comprises a piston portion which is configured to be slidably and axially movably extended through a piston bore, an end surface of said piston portion of the plunger 23 being arranged close to said nozzle 26. An eject chamber 28 is defined by the shape of the end surface of said plunger 23, the inner diameter of the bushing 25 and the outlet 27.

Figure 5A:
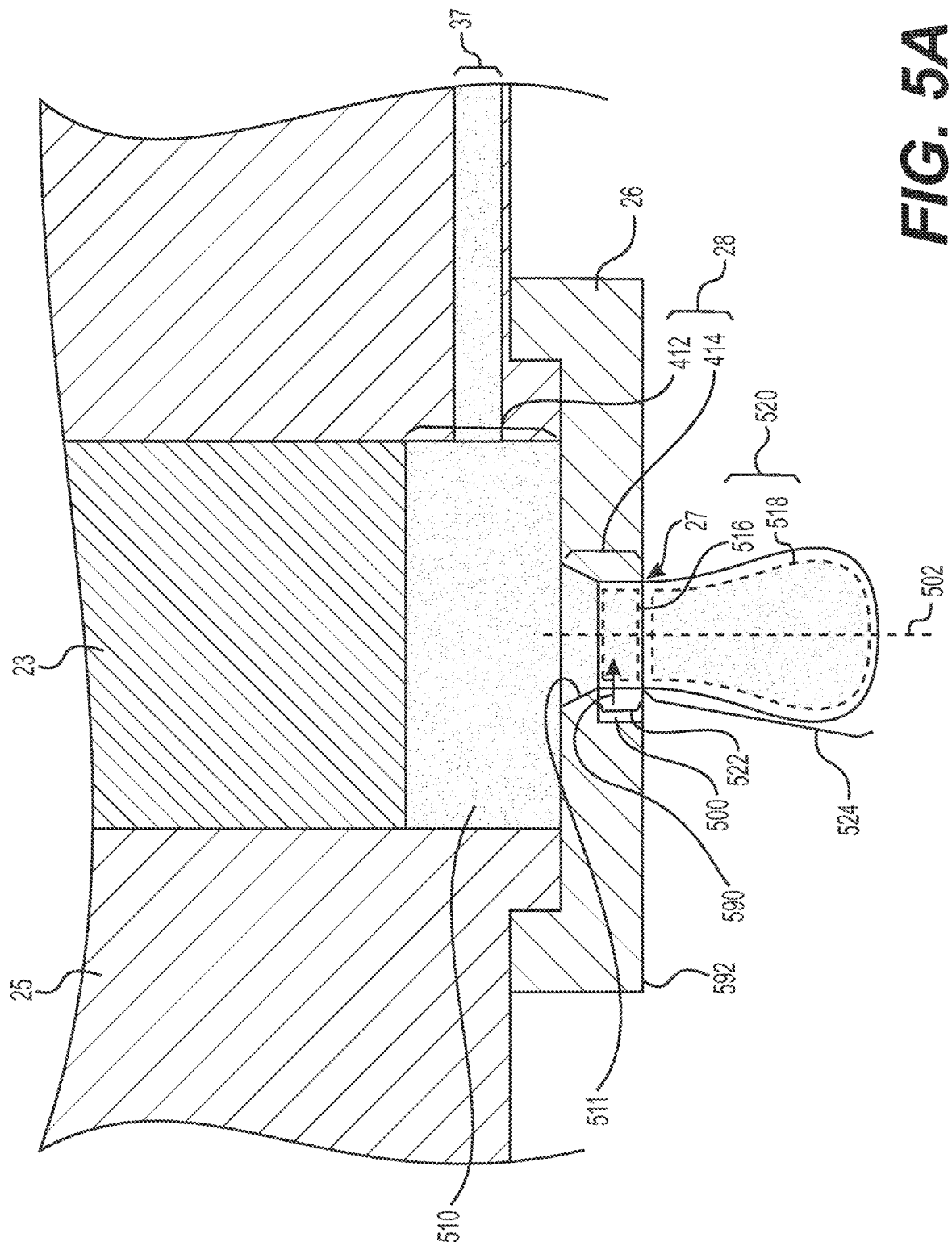
FIG. 5A is a sectional view of a portion of the jetting device illustrated in FIG. 4 according to some example embodiments of the technology disclosed herein.

A portion of the eject chamber 28 that is defined by the shape of the end surface of the plunger 23, the inner diameter of the bushing 25, and an upper surface of the nozzle 26 may be referred to herein as an internal cavity 412. A portion of the eject chamber 28 that is defined by an inner surface of a conduit extending through the nozzle may be referred to herein as a nozzle cavity 414. In some example embodiments, the nozzle cavity 414 may have a volumetric shape approximating that of a truncated conical space. As shown in FIGS. 5A-5B, the nozzle cavity 414 may have a volumetric shape that is a combination of at least a truncated conical space and a cylindrical space. It will be understood, however, that the example embodiments of the nozzle cavity 414 are not limited to the volumetric shape of the nozzle cavity 414 as shown in FIGS. 5A-5B.

Axial movement of the plunger 23 towards the nozzle 26, said movement being caused by the intermittent extension of the piezoelectric actuator 21, said movement involving the plunger 23 being received at least partially or entirely into the volume of the internal cavity 412, will cause a rapid decrease in the volume of the eject chamber 28 and thus a rapid pressurization and jetting through the outlet 27, of any solder paste contained in the eject chamber 28, including the movement of any solder paste contained in the internal cavity 412 out of the internal cavity 412 and through the nozzle cavity 414 to the outlet 27.

Solder paste may be supplied to the eject chamber 28 from the supply container 12, see FIG. 2, via a feeding device. The feeding device may be referred to herein as a viscous medium supply 430. The feeding device may be configured to induce a flow of viscous medium (e.g., "solder paste") through one or more conduits to the nozzle 26. The feeding device may include a motor (which is not shown and may be an electric motor) having a motor shaft partly provided in a tubular bore, which extends through the assembly housing 15 to an outlet communicating via a conduit 31 with said piston bore. An end portion of the motor shaft may form a rotatable feed screw which is provided in, and coaxial with, the tubular bore. A portion of the rotatable feed screw may be surrounded by an array of resilient, elastomeric a-rings arranged coaxially therewith in the tubular bore, the threads of the rotatable feed screw making sliding contact with the innermost surface of the a-rings.

The pressurized air obtained from the above-mentioned source of pressurized air (not shown) is arranged to apply a pressure on the solder paste contained in the supply container 12, thereby feeding said solder paste to an inlet port 34 communicating with the viscous medium supply 430.

An electronic control signal provided by the control device 700 of the jetting device 1 to the motor may cause the motor shaft, and thus the rotatable feed screw, to rotate a desired angle, or at a desired rotational speed. Solder paste captured between the threads of the rotatable feed screw and the inner surface of the a-rings may then be caused to travel from the inlet port 34 to the piston bore via the outlet port and the conduit 31, in accordance with the rotational movement of the motor shaft. A sealing a-ring may be provided at the top of the piston bore and the bushing 25, such that any solder paste fed towards the piston bore is prevented from escaping from the piston bore and possibly disturbing the action of the plunger 23.

The solder paste may then be fed into the eject chamber 28 via the conduit 31 and a channel 37. As shown in FIGS. 4 and 5A-5B, the channel 37 may extend through the bushing 25 to the eject chamber 28 through a sidewall of the eject chamber 28. As shown in FIGS. 4 and 5A-5B, the channel 37 has a first end in fluid communication with the conduit 31 and a second end in fluid communication with the eject chamber 28 through a sidewall of the eject chamber 28 (e.g., the sidewall of the internal cavity 412 as shown in FIGS. 4 and 5A-5B).

In some example embodiments, including the example embodiments illustrated in at least FIG. 4, the jetting device 1 includes a support plate located below or downstream of the outlet 27, as seen in the jetting direction. The support plate may include a through hole, through which the jetted droplets may pass without being hindered or negatively affected by the support plate. Consequently, the hole may be concentric with the outlet 27.

As described further below, in some example embodiments, the jetting device 1 is configured to provide improved control of the breaking of one or more droplets from the nozzle 26. Such an improved control may include providing improved control of the break-off of a filament connecting a droplet to the nozzle based on providing improve spatial and temporal filament break-off localization. As a result, the jetting device 1 may be configured to provide improved uniformity (and/or reduced unintentional variation) of droplets jetted by the jetting device on a substrate and/or reduced satellite droplet formation. Thus, the jetting device may be configured to provide workpieces having deposits thereon that have improved uniformity and reduced variation and unintended satellite deposits, thereby providing workpieces associated with improved performance and/or reliability.

FIG. 5A is a sectional view of a portion of the jetting device 1 illustrated in FIG. 4 according to some example embodiments of the technology disclosed herein. FIG. 5B is a sectional view of a portion of the jetting device 1 illustrated in FIG. 4 according to some example embodiments of the technology disclosed herein.

In some example embodiments, a portion of the viscous medium 510 located in an eject chamber 28 of the jetting device 1, including at least some of the viscous medium 510 located in and/or flowing through an internal cavity 412 and/or a nozzle cavity 414 of the eject chamber 28, may be forced through outlet 27 of the nozzle 26 by plunger 23 to form a droplet 524 that is external to the nozzle 26 and is connected to the nozzle 26, and/or a remainder of the viscous medium 510 in the nozzle 26, by at least a filament 522 of viscous medium.

In some example embodiments, the jetting device 1 includes an energy output device that is configured to deliver at least a quantum of energy to at least a portion of the viscous medium comprising the filament 522 to induce a localized and spatially and temporally well-defined break-off point of the filament 522 to cause the droplet 524 to break-off from the nozzle 26.

Referring first to FIG. 5A, in some example embodiments, the jetting device 1 includes an energy output device 500 that is configured to emit signals 590 that transfer at least a quantum of energy into a local viscous medium 516.

In some example embodiments, an energy output device may include one or more devices of an acoustic transducer, a piezoelectric material, a heater element, some combination thereof, or the like.

For example, the energy output device 500 illustrated in FIG. 5A may include an acoustic transducer that is configured to emit signals 590 that include acoustic signals. The acoustic transducer may be configured to transfer a quantum of energy into a local viscous medium 516 in the eject chamber 28 based on emitting acoustic signals that transfer acoustic waves (also referred to herein interchangeably as "acoustic energy") into the local viscous medium.

In another example, the energy output device 500 illustrated in FIG. 5A may include a piezoelectric material configured to mechanically adjust a cross-sectional flow area of at least a portion of the eject chamber 28. Such an energy output device 500 may be referred to herein interchangeably as a piezo-mechanical actuator and/or a piezoelectric actuator. As referred to herein, a piezoelectric material may include a material configured to exhibit a piezoelectric effect, including lead zirconate titanate, also referred to as PZT.

An energy output device 500 that includes a piezo-mechanical actuator may be electrically coupled to a voltage source (e.g., a power supply) and may be configured to, based on receiving an electrical signal, mechanically adjust the cross-sectional flow area of at least a portion of the nozzle 26. In the example embodiments shown in FIG. 5A, for example, an energy output device 500 that includes a piezoelectric material (e.g., a piezo-mechanical actuator) may at least partially constrict the cross-sectional flow area of the nozzle cavity 414, based on receiving an electrical signal. Such mechanical adjustment may be referred to as the energy output device 500 emitting a signal 590 that is a mechanical signal.

In some example embodiments, an energy output device 500 that includes a piezoelectric material may at least partially extend around a circumference of the nozzle cavity 414, such that the energy output device 500 may be configured to uniformly or substantially uniformly (e.g., uniformly within manufacturing tolerances and/or material tolerances) constrict the radius of the cross-section flow area of the nozzle cavity 414, based upon the energy output device 500 receiving an electrical signal.

In some example embodiments, an energy output device 500 that includes a piezoelectric material may be configured to rapidly constrict and expand the cross-sectional flow area of the nozzle cavity 414, based on receiving an electrical signal "pulse." As a result, the energy output device 500 may emit a "pulse" signal 590 that induces the mechanical adjustment (e.g., constriction and expansion) of the flow area of the nozzle cavity 414. Such pulsed adjustment may be referred to as a signal 590, emitted by the energy output device 500, that is a pulsed mechanical signal. Emitting such a mechanical signal into the local viscous medium 516 may also be referred to as piezo-mechanical actuation of the local viscous medium 516 in the nozzle cavity 414. Piezo-mechanical actuation may include compressing the local viscous medium 516 in the nozzle cavity 414. As a result, in some example embodiments, an energy output device 500 that includes a piezoelectric element may emit a signal 590 that includes a mechanical "pulsed" constriction (also referred to herein as a mechanical "pulsed" compression) of the flow area of the nozzle cavity 414 to transfer mechanical energy into the local viscous medium 516 via such pulsed constriction. Piezo-mechanical actuation of the local viscous medium by the energy output device 500 may include transferring mechanical energy into the local viscous medium 516 based on mechanical compression of the local viscous medium 516 by the energy output device 500. Piezo-mechanical actuation (e.g., compression) of the local viscous medium 516 may induce a change in one or more properties of the local viscous medium 516, including, for example, viscosity.

In some example embodiments, the energy output device 500 illustrated in FIG. 5A may include a heater element that is configured to generate heat. Such an energy output device 500 may include an electrically resistive element that may generate heat based on an electrical signal being received at the energy output device. An energy output device 500 that includes a heater element may be configured to emit a signal 590 that includes heat (e.g., a thermal signal). Such a thermal signal may transfer thermal energy into the local viscous medium 516, thereby inducing at least localized heating of the local viscous medium 516. Heating the local viscous medium 516 may induce a change in one or more properties of the local viscous medium 516, including, for example, a reduction in viscosity. In some example embodiments, the energy output device 500 may emit a signal 590 that includes thermal energy as a pulse signal (e.g., a thermal energy pulse) based on receiving a pulsed electrical signal at the energy output device 500. The pulse signal 590 may thus transfer a thermal energy pulse into the local viscous medium 516 and may thus induce at least a temporary and at least partially localized heating of the local viscous medium 516, further inducing at least a temporary and at least partially localized adjustment of one or more properties (e.g., viscosity) of the local viscous medium 516.

In some example embodiments, an energy output device, including energy output device 500 in FIG. 5A, may be isolated from an inner surface of a viscous medium conduit (e.g., an inner surface 511 of the eject chamber 28). However, it will be understood that an energy output device may be located at any location, with regard to the jetting device 1, wherein the energy output device is configured to emit a signal (e.g., an acoustic signal, mechanical signal, thermal signal, some combination thereof, or the like) that transfers energy (e.g., acoustic waves, mechanical energy thermal energy, some combination thereof, or the like) into at least a portion of the viscous medium 510 in at least a portion of the viscous medium conduit.

For example, in some example embodiments, the jetting device 1 may include an energy output device 500 that is isolated from direct contact with the inner surface 511 of the eject chamber such that the energy output device 500 is isolated from direct fluid communication with viscous medium 510 in the eject chamber 28. In some example embodiments, such an energy output device 500 may be configured to emit a signal 590 (e.g., acoustic signal, mechanical signal, thermal signal, some combination thereof, or the like) that propagates through at least a portion of the jetting device 1 (e.g., a portion of the assembly housing 15 of the jetting device) to reach the viscous medium conduit (e.g., eject chamber 28) and transfer energy (e.g., acoustic waves, mechanical energy, thermal energy, some combination thereof, or the like) in the emitted signal 590 into viscous medium 510 located in the viscous medium conduit (e.g., local viscous medium 516 within the eject chamber 28).

In some example embodiments, an energy output device may be located at an outer surface of the jetting device 1. For example, with reference to FIG. 5A, an energy output device 500 may be located on (e.g., attached to, adhered to, etc.) an outer surface of the jetting device 1 at a location, on an outer surface of the nozzle 26 (e.g., exterior surface 592), that is proximate to and/or adjacent to the outlet 27 of the nozzle 26 (e.g., an outer surface of the eject chamber 28, an outer surface of nozzle cavity 414, etc.), such that the energy output device 500 is configured to emit signals 590 (e.g., acoustic signals, mechanical signals, thermal signals, some combination thereof, or the like) that transfer energy (e.g., acoustic waves, mechanical energy, thermal energy, some combination thereof, or the like) to at least a portion of the viscous medium 510 in the viscous medium conduit (e.g., local viscous medium 516 in the nozzle cavity 414).

As shown in FIG. 5A, at least the inner surfaces 511 of the eject chamber 28 define a conduit extending from the outlet 27 of the nozzle 26 into an interior of the jetting device 1 along a longitudinal axis 502 of the outlet 27. As further shown in FIG. 5A, in some example embodiments the energy output device 500 is located at an inner surface 511 of the conduit, such that the energy output device 500 is configured to be in direct fluid communication with at least a particular portion of the viscous medium 510. However, as noted above, it will be understood that, in some example embodiments, the energy output device 500 may be isolated from being in direct fluid communication with the viscous medium 510 The particular portion of viscous medium may be referred to herein as a local viscous medium 516 in relation to the energy output device 500. As shown in FIG. 5A, the local viscous medium 516 comprises at least a portion of the filament 522.

As shown in FIG. 5A, in some example embodiments, a viscous medium supply 430 is controlled to move a volume 520 of the viscous medium 510 through the nozzle 26 and at least partially through the outlet 27 of the nozzle 26, where the volume 520 includes a first portion that is the local viscous medium 516 and a second portion 518. The second portion 518 is the portion of the volume 520 that is moved through the outlet 27, and the first portion is the local viscous medium 516 that is at least partially located in and/or is flowing through the nozzle cavity 414 of the nozzle 26 to which an energy output device 500 is configured to transfer energy based on emitting signals 590 (e.g., acoustic signals, mechanical signals, thermal signals, some combination thereof, or the like), such that the local viscous medium 516 connects the second portion 518 to the remainder of viscous medium 510 in the jetting device 1 and further connects the second portion 518 to the nozzle 26.

As shown in FIG. 5A, the second portion 518 of the volume 520 of viscous medium may at least partially form the droplet 524 of viscous medium, and the first portion of the volume 520 of viscous medium (e.g., local viscous medium 516) may at least partially form the filament 522 that connects the droplet 524 of viscous medium to the nozzle 26.

As further shown in FIG. 5A, in some example embodiments, an energy output device 500 may be controlled to emit a signal 590 (e.g., an acoustic signal, mechanical signal, thermal signal, some combination thereof, or the like) into the local viscous medium 516 that at least partially comprises the filament 522, such that the energy output device 500 delivers a quantum of energy into the local viscous medium 516. As described above, the delivery of the quantum of energy into the local viscous medium 516 may induce break-off of the filament 522 at a spatially-localized point that is in the local viscous medium 516, thereby inducing a precise, controlled break-off of the droplet 524 that at least partially comprises the second portion 518 of the volume 520 from the nozzle 26. In addition, because the energy output device 500 may induce filament 522 break-off based on directing the quantum of energy into the local viscous medium 516, the energy output device 500 may thus induce a filament 522 break-off that is temporally localized, alternatively or in addition to being spatially localized.

In some example embodiments, the energy output device 500 is configured to emit the signal 590 exclusively into the local viscous medium 516, in relation to at least the second portion 518 of the volume 520 and the remainder of the viscous medium 510 in the jetting device 1 (e.g., exclusively of the second portion 518 of the volume 520 and the remainder of the viscous medium 510 in the jetting device 1).

As shown in FIG. 5A, an energy output device 500 may be configured to emit signals 590 that transfer energy (e.g., acoustic waves, mechanical energy, thermal energy, some combination thereof, or the like) to the nozzle cavity 414, where the nozzle cavity 414 comprises at least a portion of a viscous medium cavity extending from the outlet 27 into an interior of the jetting device 1, such that the energy output device 500 is configured to emit a signal 590 that intersects the longitudinal axis 502 of the outlet 27. The energy output device 500 may be configured to emit signals 590 that transfer energy (e.g., acoustic waves, mechanical energy, thermal energy, some combination thereof, or the like) to at least the local viscous medium 516 that is located in and/or is flowing through the nozzle cavity 414, such that the energy output device 500 is configured to emit signals 590 that induce actuation (e.g., acoustic actuation, piezo-mechanical actuation, thermal actuation, some combination thereof, or the like) of at least the local viscous medium 516.

As described further above and as shown in FIG. 5A, an energy output device 500 may induce a controlled break-off point of the filament 522 that at least partially comprises the local viscous medium 516, where the break-off point is controlled to be at the local viscous medium 516, based on inducing actuation of the local viscous medium 516 that further induces localized and temporally synchronized rheological perturbations at the local viscous medium 516. For example, the signals 590 (e.g., acoustic signals, mechanical signals, thermal signals, some combination thereof, or the like) emitted by the energy output device 500 may induce shear-thinning of at least a portion of the local viscous medium 516. The energy output device 500 may emit signals 590 that cause the viscosity of the local viscous medium 516 to be reduced, thereby causing the filament 522 to break at the local viscous medium 516. One or more of the above forcing mechanisms may induce a local thinning (e.g., a "waist") of the filament 522 at the local viscous medium 516 which may further induce filament 522 break-off, and thus droplet 524 break-off, at the local viscous medium 516.

Based on inducing a controlled break-off point of the filament 522 at the local viscous medium 516, the energy output device 500 may induce filament 522 break-off and thus break-off of a droplet 524 from the nozzle 26, where the droplet 524 includes at least the second portion 518 of the volume 520 of viscous medium.

In some example embodiments, the energy output device 500 may be located at one or more various locations at the jetting device 1 such that the energy output device 500 is configured to emit a signal 590 that intersects the longitudinal axis 502 and/or is configured to emit signals 590 that transfer energy (e.g., acoustic waves, mechanical energy, thermal energy, some combination thereof, or the like) to at least a portion of the volume 520 of viscous medium. For example, in some example embodiments, the energy output device 500 may be located on an exterior surface 592 of the nozzle 26, such that the energy output device 500 is configured to emit signals 590 (e.g., acoustic signals, mechanical signals, thermal signals, some combination thereof, or the like) that transfer energy (e.g., acoustic waves, mechanical energy, thermal energy, some combination thereof, or the like) to at least a portion of the viscous medium 510 that is moved through the outlet 27 of the nozzle 26. The energy output device 500 may thus be configured to emit signals 590 into at least a portion of such viscous medium to control a break-off of a droplet 524 of the viscous medium from the nozzle 26.

Referring next to FIG. 5B, in some example embodiments, the jetting device 1 may include an energy output device that is a laser emitter 550. As shown in FIG. 5B, the laser emitter 550 may be located at an exterior surface 592 of the nozzle 26, such that the laser emitter 550 is configured to direct a laser beam 552 to impinge upon a particular portion of the volume 520 of viscous medium 510 moved through the jetting device 1. The particular portion of viscous medium, as shown in FIG. 5B, may be referred to herein as a local viscous medium 566 in relation to the laser emitter 550.

As shown in FIG. 5B, in some example embodiments, a viscous medium supply 430 is controlled to move a volume 520 of the viscous medium 510 through the nozzle 26 and at least partially through the outlet 27 of the nozzle 26, where the volume 520 includes a first portion and a second portion 568. The second portion 568 is a portion of the volume 520 that is moved through the outlet 27, and the first portion is a portion of the volume 520 that includes a portion 517 that remains internal to the nozzle 26 and further includes another portion, shown in FIG. 5B as local viscous medium 566, that is external to the nozzle 26 and is proximate to the nozzle 26, such that the other portion of viscous medium (e.g., local viscous medium 566) connects the second portion 568 of the volume 520 of viscous medium to the portion 517 of viscous medium that is within the nozzle 26. Thus, the other portion of the volume of viscous medium (e.g., local viscous medium 566) connects the second portion 568 of the volume 520 of viscous medium to the nozzle 26. As shown in FIG. 5B, the second portion 568 of the volume 520 of viscous medium may at least partially comprise a droplet 524 of the viscous medium 510 that is formed based on moving the volume 520 of viscous medium through the nozzle 26 and at least partially through the outlet 27.

As shown in FIG. 5B, the laser emitter 550 is configured to emit a laser beam 552 that intersects the longitudinal axis 502 of the outlet 27, such that the laser beam 552 impinges upon a particular portion of the filament 522. Thus, the particular portion of viscous medium may be referred to herein as a local viscous medium 566 in relation to the laser emitter 550.

In some example embodiments, the laser emitter 550 is configured to direct the laser beam 552 exclusively into the local viscous medium 566, in relation to at least the second portion 568 of the volume 520, portion 517 of the viscous medium, and the remainder of the viscous medium 510 in the jetting device 1 (e.g., exclusively of the second portion 568 of the volume 520, portion 517 of the viscous medium, and the remainder of the viscous medium 510 in the jetting device 1).

As shown in FIG. 5B, the second portion 568 of the volume 520 of viscous medium may at least partially form a droplet 524 of viscous medium, and the first portion of the volume 520 of viscous medium, including the local viscous medium 566, may at least partially form a filament 522 that connects the droplet 524 to the nozzle 26.

As further shown in FIG. 5B, in some example embodiments, the filament 522 is at least partially comprised by local viscous medium 566, such that the laser emitter 550 is configured to emit a laser beam 552 that impinges a particular limited portion of the filament 522. The laser emitter 550 may be controlled to emit a laser beam 552 into the local viscous medium 566 that at least partially comprises the filament 522, such that the laser emitter 550 delivers a quantum of energy into the local viscous medium 566. As described above, the delivery of the quantum of energy into the local viscous medium 566 may induce spatially and temporally localized break-off of the filament 522 at the local viscous medium 566, thereby inducing a precise, controlled break-off of the droplet 524 from the nozzle 26.

As described further above, the laser emitter 550 may induce a controlled break-off point of the filament 522 that at least partially comprises the local viscous medium 566, where the break-off point is controlled to be at the local viscous medium 566, based on at least one of imparting momentum into the local viscous medium 566 through photon pressure delivered by the laser beam 552 (to induce shear between the local viscous medium 566 and the second portion 568 and portion 517 to cause the local viscous medium 566 to break from at least one of portion 517 and the second portion 568), heating the local viscous medium 566 by the laser beam 552 (e.g., inducing localized heating of the local viscous medium 566) without inducing at least partial vaporization of the local viscous medium (to cause the local viscous medium 566 to break from at least one of portion 517 and the second portion 568 based on changed properties of the local viscous medium 566, such as changed viscosity, that are caused by the induced heating), and heating the local viscous medium 566 by the laser beam 552 to induce at least partial vaporization of the local viscous medium 566 (to cause the local viscous medium 566 to break from at least one of portion 517 and the second portion 568). One or more of the above forcing mechanisms may induce a local thinning (e.g., a "waist") of the filament 522 at the local viscous medium 566 which may further induce filament 522 break-off, and thus droplet 524 break-off, at the local viscous medium 566.

Based on inducing a controlled break-off point of the filament 522 at the local viscous medium 566, the laser emitter 550 may induce spatially and temporally localized filament 522 break-off and thus break-off of a droplet 524 from the nozzle 26, where the droplet 524 includes at least the second portion 568 of the volume 520 of viscous medium.

In some example embodiments, the laser emitter 550 may be located at one or more various locations at the jetting device 1 such that the laser emitter 550 is configured to emit an acoustic signal that intersects the longitudinal axis 502 and/or is configured to direct the laser beam 552 to impinge at least a local viscous medium of the viscous medium 510. For example, in some example embodiments, the laser emitter 550 may be located at an inner surface 511 of the nozzle cavity 414 of the nozzle 26, as described above with reference to FIG. 5A, such that the laser emitter 550 is configured to be in direct fluid communication with at least a portion of the viscous medium 510 that is moved through the outlet 27 of the nozzle 26. The laser emitter 550 may thus be configured to emit a laser beam 552 directly into at least a portion of such viscous medium to control a break-off of a droplet 524 of the viscous medium from the nozzle 26. As shown in FIG. 5B, in some example embodiments, the laser emitter 550 may be isolated from direct fluid communication with the viscous medium 510 and is configured to emit a laser beam 552 towards at least a portion of the viscous medium.

Figure 6:
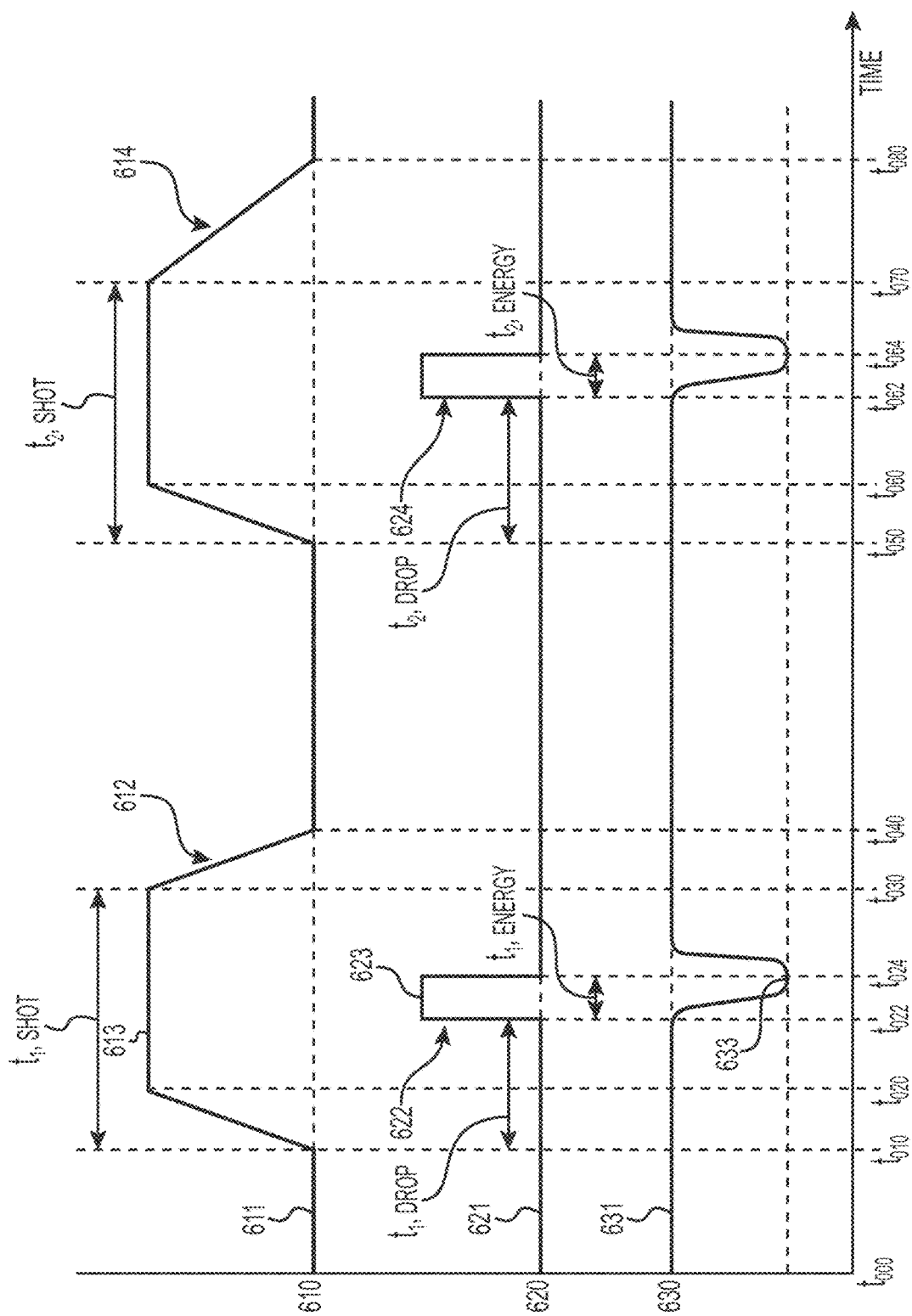
FIG. 6 is a timing chart illustrating control signals transmitted over time to at least some elements of the jetting device to cause the at least some elements of the jetting device to perform at least one operation according to some example embodiments of the technology disclosed herein.

FIG. 6 is a timing chart illustrating control signals transmitted over time to at least some elements of the jetting device 1 to cause the at least some elements of the jetting device 1 to perform at least one operation according to some example embodiments of the technology disclosed herein.

As shown in FIG. 6, an energy output device may be controlled to direct a quantum of energy (e.g., an acoustic signal, a laser beam, etc.) into at least a portion of the viscous medium jetted through an outlet 27 of the nozzle 26 (e.g., a local viscous medium), to control a breaking of the droplet from the nozzle 26, for at least one particular, limited period of time during a jetting operation. As further shown, the energy output device may be controlled based on one or more control signals generated and/or transmitted with regard to one or more other elements of the jetting device 1.

FIG. 6 illustrates a timing chart showing the magnitude and/or timing of various control signals that may be generated and/or transmitted by one or more control devices of the jetting device 1 during a jetting operation. The timing chart illustrated in FIG. 6 further shows a magnitude of a rheological property of at least a portion of the viscous medium in the jetting device, where the portion includes the local viscous medium in relation to an energy output device, at different times during the jetting operation and in relation to control signals generated and/or transmitted with regard to the actuator 21 and/or an energy output device.

As shown, the timing chart of FIG. 6 illustrates a control signal 610 (an "actuator control signal") transmitted to an actuator 21 in the jetting device, a control signal 620 ("energy output device control signal") transmitted to an energy output device (that may include one or more of the energy output device 500 and the laser emitter 550 illustrated in FIGS. 5A-5B, respectively), and a rheological property 630 of at least the local viscous medium in relation to the energy output device to which the control signal 620 may be transmitted. While control signal 620 is illustrated as a control signal that is generated and/or transmitted for a single, individual energy output device, it will be understood that multiple control signals may be separately and/or independently generated and/or transmitted for separate, respective energy output devices in the jetting device during a jetting operation.

Still referring to FIG. 6, line 630 represents a value of at least one rheological property of at least a local viscous medium in relation to the energy output device. For example, line 630 may represent a magnitude of the viscosity of the local viscous medium. Accordingly, as shown in FIG. 6, at least one rheological property of the local viscous medium, including viscosity as shown in FIG. 6, may be adjusted based on a control signal 620 being generated and/or transmitted to an energy output device of the jetting device 1.

As shown in FIG. 6, in some example embodiments, a jetting operation may include generating and/or transmitting control signal 610 in multiple signal "pulses" 612, 614. The control signal 610 may be a voltage signal, such that each pulse 612, 614 is a change in the magnitude of voltage on a transmission line and/or over a communication network in communication with the actuator 21. Each individual control signal 610 pulse 612, 614 may cause an actuator 21 of the jetting device 1 to jet an individual droplet from the nozzle 26. An individual jetting of an individual droplet may be referred to herein as a "shot."

As further shown in FIG. 6, a pulse 612, 614 may initiate at a particular time point, rapidly increase in magnitude from an initial magnitude 611 to a particular magnitude value 613, maintain the signal 610 magnitude 613 over a period of time, and then drop off in magnitude to the initial magnitude 611. Such a time-varying signal 610 magnitude behavior may correspond to initiating and maintaining a signal 610 magnitude for a particular period of time, where the signal 610 increases to a particular (or, alternatively, predetermined) magnitude 613 associated with causing the actuator 21 to cause an individual droplet to be jetted and is held at the magnitude 613 for a period of time that is associated with causing the actuator 21 to cause an individual droplet to be jetted. Upon the elapse of the particular period of time, the pulse 612, 614 may be discontinued, and the magnitude of the signal 610 may drop over a period of time to an initial magnitude 611.

Each pulse 612, 614, when generated and/or transmitted, may cause the actuator 21 to operate to move a volume of viscous medium through the nozzle 26 of the jetting device, such that an individual droplet of viscous medium is jetted from the nozzle 26. Accordingly, in some example embodiments, including the example embodiments illustrated in FIG. 6, each pulse 612, 614 of control signal 610 may represent a jetting of an individual droplet of viscous medium.

Still referring to FIG. 6, control signal 620 is a magnitude of a signal (e.g., a voltage signal) that is generated and/or transmitted to an energy output device of the jetting device during a jetting operation. As further shown in FIG. 6, one or more pulses 622, 624 of control signal 620 may be generated and/or transmitted to the energy output device during a jetting operation. Each individual pulse 622, 624 may cause the energy output device to direct a particular quantum of energy to intersect a longitudinal axis of the outlet 27 of the nozzle 26 and or to impinge at least a local viscous medium in relation to the energy output device. The amount of energy included in the quantum of energy may be set and/or controlled based on the magnitude 623 of the signal pulse 622, 624 and/or the period of time over which the pulse 622 is maintained.

Still referring to FIG. 6, the variation of the magnitude of line 630 illustrates the variation of at least one property of the local viscous medium based on the quantum of energy directed to the local viscous medium by the energy output device. As shown in FIG. 6, the generating and/or transmission of signal pulse 622 causes the energy output device to direct a quantum of energy to the local viscous medium, which causes the one or more properties 630 of the local viscous medium to be adjusted.

For example, where the energy output device is an acoustic transducer that is emit acoustic signals that transfer acoustic waves to the local viscous medium, signal pulse 622 causes the acoustic transducer to direct an acoustic signal into the local viscous medium, which further may cause the viscosity of the local viscous medium to be reduced, as shown by line 630.

As shown in FIG. 6, when the signal pulse 622 is discontinued, the one or more properties of the local viscous medium as represented by line 360 may return from a new value 633 associated with an adjusted state to a an initial value 631 associated with an initial state.

Still referring to FIG. 6, a jetting operation may be initiated at time $t_{000}$ and may include initiating control signal 610 pulse 612 at time $t_{010}$ and maintaining the pulse for a particular period of elapsed time $t_{1,shot}$. The jetting operation may further include subsequently initiating another pulse 614 at time $t_{050}$ and maintaining the signal pulse 614 for a period of time $t_{2,shot}$. The particular signal magnitudes 613 of pulses 612, 614 may be the same or different. The magnitudes of $t_{1,shot}$ and $t_{2,shot}$ may be the same amount of elapsed time or different amounts of elapsed time.

As further shown in FIG. 6, each signal pulse 612, 614 includes a rapid increase in signal 610 magnitude, starting at a time of initiation of the pulse, from an initial magnitude 611 to a particular magnitude 613 of the pulse, and the pulse magnitude 613 being maintained until a particular period of elapsed time from the time of initiation of the signal pulse, after which time the signal pulse magnitude drops off to the initial signal 610 magnitude 611. For example, signal pulse 612 is initiated at time $t_{010}$ and the signal 610 magnitude rapidly increases from time $t_{010}$ to time $t_{020}$ to a particular signal magnitude 613 (e.g., a particular voltage) associated with the pulse 612. The signal 610 may be maintained at the particular magnitude 613 until time $t_{030}$ at which a particular period of time $t_{1,shot}$ has elapsed from the time $t_{010}$ at which the pulse 612 is initiated. At time $t_{030}$, the pulse 612 may be discontinued, such that the signal 610 magnitude drops off, starting at time $t_{030}$, from the particular signal magnitude 613 back to the initial magnitude 611 at time $t_{040}$. Subsequently, pulse 614 may be initiated at time $t_{050}$, such that the magnitude of signal 610 increases to a particular signal magnitude 613 associated with pulse 614 at time t060. The pulse 614 may be maintained (e.g., signal 610 maintained at the particular magnitude 613) until the elapse of a particular period of time $t_{2,shot}$ associated with pulse 614, at time $t_{070}$, and the signal 610 magnitude may drop off in magnitude from time $t_{070}$ to the initial magnitude 611 at $t_{080}$.

In some example embodiments, as noted above, each pulse 612, 614 may have a particular magnitude 613 and period of time $t_{1,shot}$ and $t_{2,shot}$, respectively, that causes the actuator 21 to cause a particular amount of viscous medium to be moved through the nozzle to cause a droplet having a particular size to be formed.

Still referring to FIG. 6, the energy output device (e.g., an acoustic transducer and/or a laser emitter) may be actuated (e.g., activated, controlled, etc.) to direct a quantum of energy to the local viscous medium after an elapse of a particular amount of time from the initiation of a control signal pulse to cause the actuator 21 to jet an individual droplet. Restated, the energy output device may be controlled to direct a quantum of energy based on the actuator being controlled to move a volume of viscous medium through the nozzle 26 and/or to jet an individual droplet from the nozzle 26.

As shown in FIG. 6, separate pulses 622, 624 of signal 620 to control the energy output device are generated and/or transmitted based on corresponding pulses 612, 614 of signal 610 to control the actuator 21. As further shown, each separate pulse 622, 624 has a particular signal magnitude 623 (e.g., voltage magnitude) over an initial magnitude 621 of the signal 620, is initiated a particular amount of elapsed time following the initiation of the corresponding actuator control signal pulse 612, 614, and is maintained for a particular period of elapsed time. One or more of the magnitude 623 of the pulse of signal 620, the period of time after the corresponding control signal 610 pulse is initiated at which the respective pulse of signal 620 is initiated, and the period of time over which the signal pulse 620 is maintained may be controlled to control the break-off of a droplet filament that may be caused by the energy output device being actuated by the pulses 612, 614.

In FIG. 6, pulse 622 is initiated at a particular amount of time $t_{1,drop}$ following the time at which the corresponding actuator control signal pulse 612 is initiated at time $t_{010}$. Thus, pulse 622 is initiated at time $t_{022}$ and is ended at time $t_{024}$. Pulse 622 is further maintained, at a signal magnitude 623 associated with pulse 622, for a particular period of elapsed time $t_{1,energy}$. In FIG. 6, pulse 622 is a square wave signal, although pulse 622 may be a time-varying signal as shown with regard to corresponding signal pulse 612.

As shown in FIG. 6, pulse 622 causes the energy output device to deliver a quantum of energy to the local viscous medium from time $t_{022}$ to time $t_{024}$. As a result, the property of the local viscous medium, as represented by line 630, begins changing at time $t_{022}$ to a new value 633 and begins to return to the initial value 631 at time $t_{024}$. As shown in FIG. 6, the change in local viscous medium property may be non-instantaneous. In some example embodiments, the change in local viscous medium property as presented by line 630, based on the signal pulse 622, may be instantaneous or substantially instantaneous (e.g., instantaneous within manufacturing tolerances and/or material tolerances).

The change in the local viscous medium property (e.g., temperature, viscosity, momentum, etc.) from time $t_{022}$ to time $t_{024}$ may induce a break-off of a droplet filament that is at least partially comprised of the local viscous medium. As a result, the signal pulse 622 causes a controlled break-off of the droplet formed by signal pulse 612 from the nozzle 26. The timing $t_{1,drop}$ and/or $t_{1,energy}$, in addition or in alternative to the magnitude of pulse 622, may be controlled to control the point of the filament break-off, spatially and/or temporally, and thus control the break-off of the droplet from the nozzle.

Still referring to FIG. 6, pulse 624 is initiated at a particular amount of time $t_{2,drop}$ following the time at which the corresponding actuator control signal pulse 614 is initiated at time $t_{050}$. Thus, pulse 624 is initiated at time $t_{062}$ and is ended at time $t_{064}$. Pulse 624 is further maintained, at a signal magnitude 623 associated with pulse 624, for a particular period of elapsed time $t_{2,energy}$. In FIG. 6, pulse 624 is a square wave signal, although pulse 624 may be a time-varying signal as shown with regard to corresponding signal pulse 614.

As shown in FIG. 6, pulse 624 causes the energy output device to deliver a quantum of energy to the local viscous medium from time $t_{062}$ to time $t_{064}$. As a result, the property of the local viscous medium, as represented by line 630, begins changing at time $t_{062}$ to a new value 633 and begins to return to the initial value 631 at time $t_{064}$. As shown in FIG. 6, the change in local viscous medium property may be non-instantaneous. In some example embodiments, the change in local viscous medium property as presented by line 630, based on the signal pulse 624, may be instantaneous or substantially instantaneous (e.g., instantaneous within manufacturing tolerances and/or material tolerances).

The change in the local viscous medium property (e.g., temperature, viscosity, momentum, etc.) from time $t_{062}$ to time $t_{064}$ may induce a break-off of a droplet filament that is at least partially comprised of the local viscous medium. As a result, the signal pulse 624 causes a controlled break-off of the droplet formed by signal pulse 614 from the nozzle 26. The timing $t_{2,drop}$ and/or $t_{2,energy}$, in addition or in alternative to the magnitude of pulse 624, may be controlled to control the point of the filament break-off and thus control the break-off of the droplet from the nozzle.

Based on controlling the filament break-off point, and thus controlling the breakoff of the droplet from the nozzle 26, as shown in FIG. 6 with regard to pulses 622 and 624, one or more properties of the droplet may be controlled, including size and/or shape of the droplet. In addition, the generation ("formation") of satellite droplets as a result of the droplet break-off may be reduced, based on inducing the droplet break-off based on inducing the filament break-off to occur at a specific, controlled break-off spatial and/or temporal point based on the pulses 622, 624. As a result, in addition to controlling the droplet properties, which may result in improved uniformity and reduced unintended variation in the deposits formed on a workpiece (e.g., a circuit board) based on the droplets, the occurrence of satellite deposits from satellite droplet formation may be reduced. Such improvements may result in a workpiece having improved performance and improved reliability (e.g., reduced probability of electrical shorts involving satellite deposits and/or deposits having an unintended size).

Figure 7:
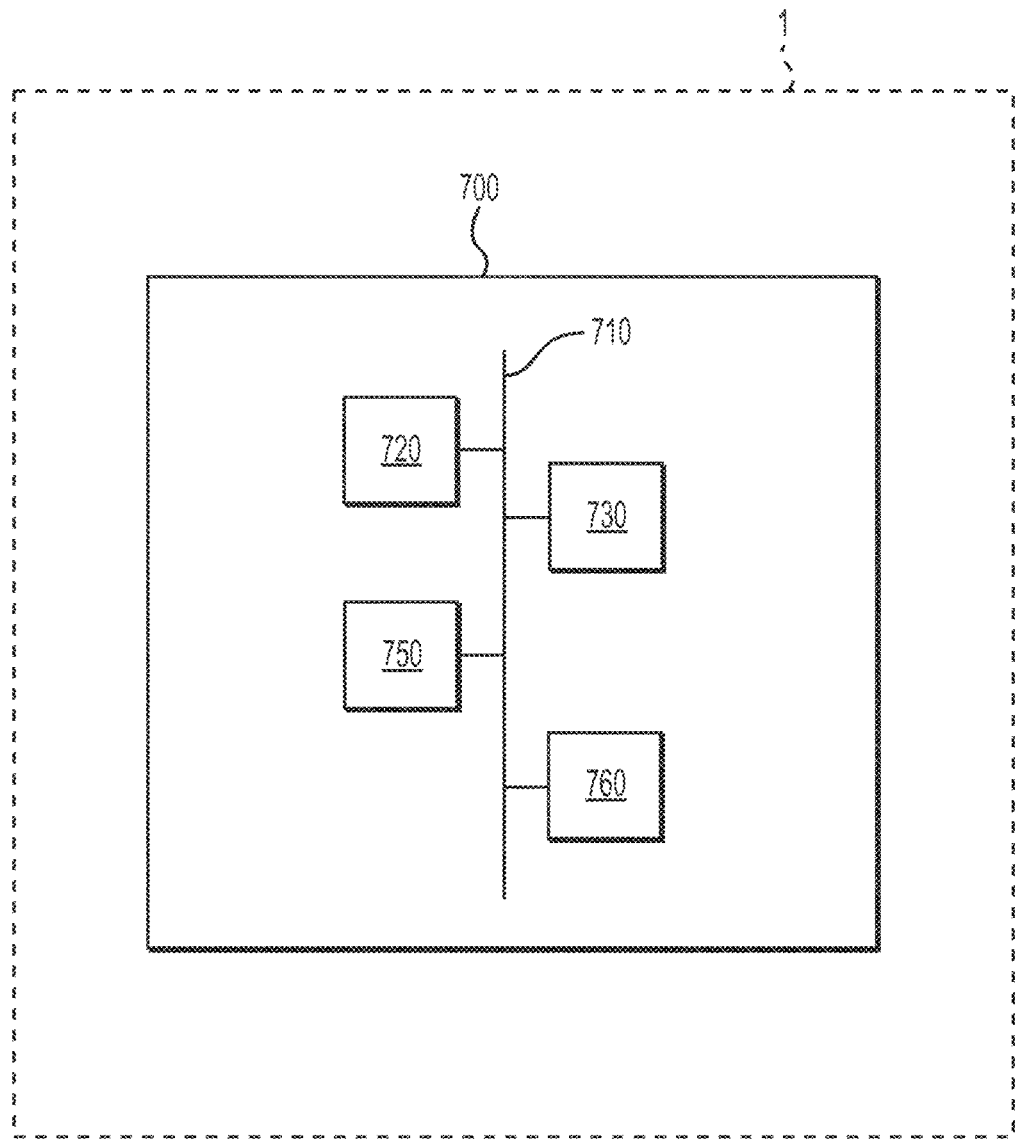
FIG. 7 is a schematic diagram illustrating a jetting device that includes a control device according to some example embodiments of the technology disclosed herein.

FIG. 7 is a schematic diagram illustrating a jetting device 1 that includes a control device 700 according to some example embodiments of the technology disclosed herein. The jetting device 1 shown in FIG. 7 may be a jetting device 1 according to any of the example embodiments illustrated and described herein, including any one of the jetting devices 1 illustrated in FIGS. 1-3, FIG. 4, and FIGS. 5A-5B.

Referring to FIG. 7, the control device 700 includes a memory 720, a processor 730, a communication interface 750, and a control interface 760.

In some example embodiments, including the example embodiments shown in FIG. 7, the control device 700 may be included in a jetting device 1. In some example embodiments, the control device 700 may include one or more computing devices. A computing device may include a personal computer (PC), a tablet computer, a laptop computer, a netbook, some combination thereof, or the like.

The memory 720, the processor 730, the communication interface 750, and the control interface 760 may communicate with one another through a bus 710.

The communication interface 750 may communicate data from an external device using various network communication protocols. For example, the communication interface 750 may communicate sensor data generated by a sensor (not illustrated) of the control device 700 to an external device. The external device may include, for example, an image providing server, a display device, a mobile device such as, a mobile phone, a smartphone, a personal digital assistant (PDA), a tablet computer, and a laptop computer, a computing device such as a personal computer (PC), a tablet PC, and a netbook, an image outputting device such as a TV and a smart TV, and an image capturing device such as a camera and a camcorder.

The processor 730 may execute a program of instructions and control the control device 700. The processor 730 may execute a program of instructions to control one or more portions of the jetting device 1 via generating and/or transmitting control signals to one or more elements of the jetting device 1 via one or more control interfaces 760. A program of instructions to be executed by the processor 730 may be stored in the memory 720.

The memory 720 may store information. The memory 720 may be a volatile or a nonvolatile memory. The memory 720 may be a non-transitory computer readable storage medium. The memory may store computer-readable instructions that, when executed by at least the processor 730, cause the at least the processor 730 to execute one or more methods, functions, processes, etc. as described herein. In some example embodiments, the processor 730 may execute one or more of the computer-readable instructions stored at the memory 720.

In some example embodiments, the control device 700 may transmit control signals to one or more of the elements of the jetting device 1 to execute and/or control a jetting operation whereby one or more droplets are jetted to a substrate and one or more acoustic transducers are controlled to emit one or more acoustic signals. For example, the control device 700 may transmit one or more sets of control signals to one or more, actuators, flow generators, acoustic transducers, some combination thereof, or the like, according to one or more programs of instruction. Such programs of instruction, when implemented by the control device 700 may result in the control device 700 generating and/or transmitting control signals to one or more elements of the jetting device 1 to cause the jetting device 1 to perform one or more jetting operations.

In some example embodiments, the control device 700 may generate and/or transmit one or more sets of control signals according to any of the timing charts illustrated and described herein, including the timing chart illustrated in FIG. 6. In some example embodiments, the processor 730 may execute one or more programs of instruction stored at the memory 720 to cause the processor 730 to generate and/or transmit one or more sets of control signals according to any of the timing charts illustrated and described herein, including the timing chart illustrated in FIG. 6.

In some example embodiments, the communication interface 750 may include a user interface, including one or more of a display panel, a touchscreen interface, a tactile (e.g., "button," "keypad," "keyboard," "mouse," "cursor," etc.) interface, some combination thereof, or the like. Information may be provided to the control device 700 via the communication interface 750 and stored in the memory 720. Such information may include information associated with the board 2, information associated with the viscous medium to be jetted to the board 2, information associated with one or more droplets of the viscous medium, some combination thereof, or the like. For example, such information may include information indicating one or more properties associated with the viscous medium, one or more properties (e.g., size) associated with one or more droplets to be jetted to the board 2, some combination thereof, or the like.

In some example embodiments, the communication interface 750 may include a USB and/or HDMI interface. In some example embodiments, the communication interface 750 may include a wireless network communication interface.

The foregoing description has been provided for purposes of illustration and description. It is not intended to be exhaustive. Individual elements or features of a particular example embodiment are generally not limited to that particular example, but are interchangeable where applicable and can be used in a selected embodiment, even if not specifically shown or described. The same may also be varied in many ways. Such variations are not to be regarded as a departure from example embodiments, and all such modifications are intended to be included within the scope of the example embodiments described herein.

Itemized Embodiments

1. A software controlled ejector configured to jet a droplet of a viscous medium, the device comprising:
  a nozzle including an outlet, the nozzle configured to jet the droplet through the outlet;
  an energy output device configured to direct a quantum of energy into at least a portion of the viscous medium jetted through the outlet to control a breaking of the droplet from the nozzle;
  a memory configured to store a program of instructions; and
  a processor configured to execute the program of instructions to,
    control an actuator of a jetting device, according to a predetermined actuator control sequence, to jet a sequence of droplets of a viscous medium through a jetting outlet of the jetting device on to a substrate, and
    control an energy output device configured to direct a quantum of energy into at least a portion of the viscous medium jetted through the outlet to control a breaking of the droplet from the nozzle that is based or dependent on the actuator control sequence, thereby controlling the breaking of the droplets from the nozzle.
2. The device of claim 1, wherein,
  the energy output device includes an acoustic transducer configured to emit an acoustic signal into the portion of the viscous medium jetted through the outlet to control the breaking of the droplet from the nozzle, based on acoustic actuation of the portion of the viscous medium.
3. The device of claim 2, wherein the acoustic actuation includes inducing shear-thinning of the portion of the viscous medium.
4. The device of claim 2, wherein,
  the nozzle includes a conduit extending from the outlet into an interior of the device; and
  the acoustic transducer is located at the conduit, such that the acoustic transducer is configured to emit acoustic signals that transfer acoustic waves to viscous medium passing through the conduit to the outlet.
5. The device of claim 1, wherein,
  the energy output device includes a laser emitter configured to emit a laser beam that impinges on the portion of the viscous medium jetted through the outlet to control the breaking of the droplet from the nozzle, based on at least one of,
    imparting momentum into the portion of the viscous medium through photon pressure,
    inducing at least partial vaporization of the portion of the viscous medium, and
    inducing localized heating of the portion of the viscous medium.
6. The device of claim 5, wherein,
  the laser emitter is located external to the nozzle, such that the laser emitter is configured to emit the laser beam to impinge upon a portion of the viscous medium that has exited the nozzle through the outlet.
7. The device of claim 1, wherein,
  the energy output device includes a piezoelectric element and is configured to direct the quantum of energy into at least the portion of the viscous medium based on adjusting a cross-sectional flow area of the nozzle.
8. The device of claim 1, wherein,
  the energy output device includes a heater element and is configured to direct the quantum of energy into at least the portion of the viscous medium based on generating heat.
9. The device of claim 1, further comprising:
  a control device configured to
    control a viscous medium supply to move a volume of the viscous medium through the nozzle to the outlet of the nozzle to jet the droplet; and
    control the energy output device to direct the quantum of energy into at least the portion of the viscous medium at a particular period of elapsed time after controlling the viscous medium supply to move the volume.
10. A method for controlling a jetting of a droplet of a viscous medium through a nozzle, the method comprising:
  controlling an actuator of a jetting device, according to a predetermined actuator control sequence, to jet a sequence of droplets of a viscous medium through a jetting outlet of the jetting device on to a substrate;
  controlling a viscous medium supply to move a volume of the viscous medium through the nozzle to an outlet of the nozzle; and
  controlling an energy output device to deliver a quantum of energy to a first portion of the volume of the viscous medium to cause at least a separate, second portion of the volume of the viscous medium to break from the nozzle to form the droplet, wherein the controlling of the energy output device and thereby the timing of the breaking of the droplet from the nozzle is based or dependent on the timing of the actuator control sequence, thereby controlling the breaking of the droplets from the nozzle.
11. The method of claim 10, wherein,
  the quantum of energy is delivered exclusively to the first portion of the volume of the viscous medium, independently of the separate, second portion of the volume of the viscous medium.
12. The method of claim 10, wherein,
  the energy output device includes an acoustic transducer; and
  the controlling the energy output device includes controlling the acoustic transducer to emit an acoustic signal into the first portion of the viscous medium jetted through the nozzle to cause at least the separate, second portion of the volume to break from the nozzle based on acoustic actuation of the first portion of the viscous medium.
13. The method of claim 12, wherein the causing at least the separate, second portion of the volume to break from the nozzle includes inducing shear-thinning in the first portion of the volume of the viscous medium based on the acoustic actuation.
14. The method of claim 10, wherein,
  the energy output device includes a laser emitter; and
  the controlling the energy output device includes controlling the laser emitter to emit a laser beam that impinges on at least the first portion of the viscous medium jetted through the outlet to cause at least the separate, second portion of the volume to break from the nozzle, based on at least one of,
    imparting momentum into at least the first portion of the volume through photon pressure,
    inducing at least partial vaporization of the first portion of the volume, and
    inducing localized heating of the portion of the first portion of the viscous medium.

15. The method of claim 10, wherein,
the energy output device includes a piezoelectric element; and
the controlling the energy output device includes controlling the piezoelectric element to adjust a cross-sectional flow area of the nozzle.

16. The method of claim 10, wherein,
the energy output device includes a heater element; and
the controlling the energy output device includes controlling the heater element to direct the quantum of energy into at least the portion of the viscous medium based on generating heat.

17. The method of claim 10, wherein,
the controlling the energy output device includes controlling the energy output device to direct the quantum of energy into at least the first portion of the volume at a particular period of elapsed time after controlling the viscous medium supply to move the volume.

18. A device configured to jet a droplet of a viscous medium, the device comprising:
an actuator of a jetting device, wherein the actuator is controlled according to a predetermined actuator control sequence, to jet a sequence of droplets of a viscous medium through a jetting outlet of the jetting device on to a substrate;
a nozzle including the outlet, the nozzle configured to jet the droplet based on a volume of the viscous medium moving through the outlet along a longitudinal axis of the outlet; and
an energy output device configured to direct a quantum of energy to intersect the longitudinal axis of the outlet, such that the energy output device is configured to direct the quantum of energy into at least a portion of the volume of the viscous medium, wherein the energy output device is configured so that the timing of when to direct a quantum of energy to intersect the longitudinal axis of the outlet is based or dependent on the actuator control sequence, thereby controlling the breaking of the droplets from the nozzle.

19. The device of claim 18, wherein,
the energy output device includes an acoustic transducer configured to emit an acoustic signal that intersects the longitudinal axis of the outlet.

20. The device of claim 19, wherein,
the nozzle includes a conduit extending from the outlet into an interior of the device along the longitudinal axis of the outlet; and
the acoustic transducer is configured to emit acoustic signals that transfer acoustic waves to viscous medium passing through the conduit along the longitudinal axis of the outlet.

21. The device of claim 19, wherein,
the acoustic transducer is configured to emit the acoustic signal that intersects the longitudinal axis of the outlet to control the breaking of the droplet from the nozzle, based on acoustic actuation of at least a portion of the volume of the viscous medium.

22. The device of claim 21, wherein the acoustic actuation includes inducing shear-thinning of the portion of the viscous medium.

23. The device of claim 18, wherein,
the energy output device includes a laser emitter configured to emit a laser beam that that intersects the longitudinal axis of the outlet.

24. The device of claim 23, wherein,
the laser emitter is configured to emit the laser beam that intersects the longitudinal axis of the outlet to control the breaking of the droplet from the nozzle, based on at least one of,
imparting momentum into at least a portion of the volume of the viscous medium through photon pressure,
inducing at least partial vaporization of at least the portion of the volume of the viscous medium, and
inducing localized heating of at least the portion of the viscous medium.

25. The device of claim 24, wherein,
the laser emitter is located external to the nozzle, such that the laser emitter is configured to emit the laser beam to impinge upon a portion of the viscous medium that has exited the nozzle through the outlet.

26. The device of claim 18, wherein,
the energy output device includes a piezoelectric element and is configured to emit a mechanical signal that intersects the longitudinal axis of the outlet.

27. The device of claim 18, wherein,
the energy output device includes a heater element and is configured emit a thermal signal that intersects the longitudinal axis of the outlet.

28. The device of claim 18, further comprising:
a control device configured to
control a viscous medium supply to move the volume of the viscous medium through the nozzle to the outlet of the nozzle to jet the droplet; and
control the energy output device to direct the quantum of energy to intersect the longitudinal axis of the outlet at a particular period of elapsed time after controlling the viscous medium supply to move the volume.

29. A method for controlling a jetting of a droplet of a viscous medium through a nozzle, the method comprising:
controlling an actuator of a jetting device, according to a predetermined actuator control sequence, to jet a sequence of droplets of a viscous medium through a jetting outlet of the jetting device on to a substrate;
controlling a viscous medium supply to move a volume of the viscous medium through the nozzle to an outlet of the nozzle along a longitudinal axis of the outlet; and
controlling an energy output device to deliver a quantum of energy to intersect the longitudinal axis of the outlet such that the quantum of energy is delivered into a first portion of the volume of the viscous medium subsequently to a separate, second portion of the volume of the viscous medium exiting the nozzle through the outlet, wherein the controlling of the energy output device and thereby the timing of the breaking of the droplet from the nozzle is based or dependent on the timing of the actuator control sequence, thereby controlling the breaking of the droplets from the nozzle.

30. The method of claim 29, wherein,
the quantum of energy is delivered exclusively to the first portion of the volume of the viscous medium, independently of the separate, second portion of the volume of the viscous medium.

31. The method of claim 29, wherein,
the controlling the energy output device includes controlling the energy output device to direct the quantum of energy to intersect the longitudinal axis of the outlet at a particular period of elapsed time after controlling the viscous medium supply to move the volume.

What is claimed is:
1. A device configured to jet a droplet of a viscous medium, the device comprising:
a jetting device including an actuator and a nozzle, wherein the actuator is configured to cause a volume of the viscous medium to move at least partially through an outlet of the nozzle to form the droplet such that the droplet is external to the nozzle, the volume of the viscous medium including a first portion and a second portion, the first portion of the volume of the viscous medium at least partially forming a filament that connect the droplet to a remainder of the viscous medium that is in the nozzle, the second portion of the volume of the viscous medium at least partially forming the droplet and being separate from the first portion of the volume of the viscous medium; and an energy output device that is separate from the actuator and is configured to direct a quantum of energy into the first portion of the volume of the viscous medium, separately from the actuator moving the volume of the viscous medium at least partially through the outlet, to control a breaking of the filament to break the droplet that includes the second portion of the volume of the viscous medium from the nozzle.

2. The device of claim 1, wherein, the energy output device includes an acoustic transducer configured to emit an acoustic signal into the first portion of the volume of the viscous medium to control the breaking of the second portion of the volume of the viscous medium from the nozzle, based on acoustic actuation of the first portion of the viscous medium.

3. The device of claim 2, wherein the acoustic actuation includes inducing shear-thinning of the first portion of the volume of the viscous medium.

4. The device of claim 2, wherein, the nozzle includes a conduit extending from the outlet into an interior of the device; and the acoustic transducer is located at the conduit, such that the acoustic transducer is configured to emit acoustic signals that transfer acoustic waves to viscous medium passing through the conduit to the outlet.

5. The device of claim 1, wherein, the energy output device includes a laser emitter configured to emit a laser beam that impinges on the first portion of the volume of the viscous medium to control the breaking of the second portion of the volume of the viscous medium from the nozzle, based on at least one of, imparting momentum into the first portion of the volume of the viscous medium through photon pressure, inducing at least partial vaporization of the first portion of the volume of the viscous medium, and inducing localized heating of the first portion of the volume of viscous medium.

6. The device of claim 5, wherein, the first portion of the volume of the viscous medium is included in a portion of the volume of the viscous medium that has exited the nozzle through the outlet, and the laser emitter is located external to the nozzle, such that the laser emitter is configured to emit the laser beam to impinge upon the first portion of the volume of the viscous medium.

7. The device of claim 1, wherein, the energy output device includes a piezoelectric element and is configured to direct the quantum of energy into at least the first portion of the volume of the viscous medium based on adjusting a cross-sectional flow area of the nozzle.

8. The device of claim 1, wherein, the energy output device includes a heater element and is configured to direct the quantum of energy into at least the portion of the viscous medium based on generating heat.

9. The device of claim 1, further comprising:

a control device configured to control the actuator of the jetting device move the volume of the viscous medium through the nozzle and at least partially through the outlet of the nozzle to jet the droplet; and control the energy output device to direct the quantum of energy into at least the first portion of the volume of the viscous medium at a particular period of elapsed time after controlling the actuator of the jetting device to move the volume of the viscous medium.

10. A method for controlling a jetting of a droplet of a viscous medium through a nozzle, the method comprising:

controlling an actuator of a jetting device cause a volume of the viscous medium to move through the nozzle and at least partially through an outlet of the nozzle to form the droplet such that the droplet is external to the nozzle, the volume of the viscous medium including a first portion and a second portion, the first portion of the volume of the viscous medium at least partially forming a filament that connects the droplet to a remainder of the viscous medium that is in the nozzle, the second portion of the volume of the viscous medium at least partially forming the droplet and being separate from the first portion of the volume of the viscous medium; and controlling an energy output device that is separate from the actuator to deliver a quantum of energy to the first portion of the volume of the viscous medium, separately from the actuator moving the volume of the viscous medium at least partially through the outlet, to control a breaking of the filament to break the droplet that includes the second portion of the volume of the viscous medium from the nozzle.

11. The method of claim 10, wherein, the quantum of energy is delivered exclusively to the first portion of the volume of the viscous medium, independently of the separate, second portion of the volume of the viscous medium.

12. The method of claim 10, wherein, the energy output device includes an acoustic transducer; and the controlling the energy output device includes controlling the acoustic transducer to emit an acoustic signal into the first portion of the volume of the viscous medium jetted through the nozzle to cause at least the separate, second portion of the volume to break from the nozzle based on acoustic actuation of the first portion of the volume of the viscous medium.

13. The method of claim 12, wherein the causing at least the separate, second portion of the volume to break from the nozzle includes inducing shear-thinning in the first portion of the volume of the viscous medium based on the acoustic actuation.

14. The method of claim 10, wherein, the energy output device includes a laser emitter; and the controlling the energy output device includes controlling the laser emitter to emit a laser beam that impinges on at least the first portion of the volume of the viscous medium to cause at least the separate, second portion of the volume of the viscous medium to break from the nozzle, based on at least one of, imparting momentum into at least the first portion of the volume of the viscous medium through photon pressure, inducing at least partial vaporization of the first portion of the volume of the viscous medium, and
inducing localized heating of the first portion of the volume of the viscous medium.

15. The method of claim 10, wherein,
the energy output device includes a piezoelectric element; and
the controlling the energy output device includes controlling the piezoelectric element to adjust a cross-sectional flow area of the nozzle.

\* \* \* \* \*